March 7, 1961     H. L. PAULDING ET AL     2,973,897
PUNCHED TAPE CONTROL MECHANISM
Filed Feb. 13, 1956     7 Sheets-Sheet 1

FIG.5

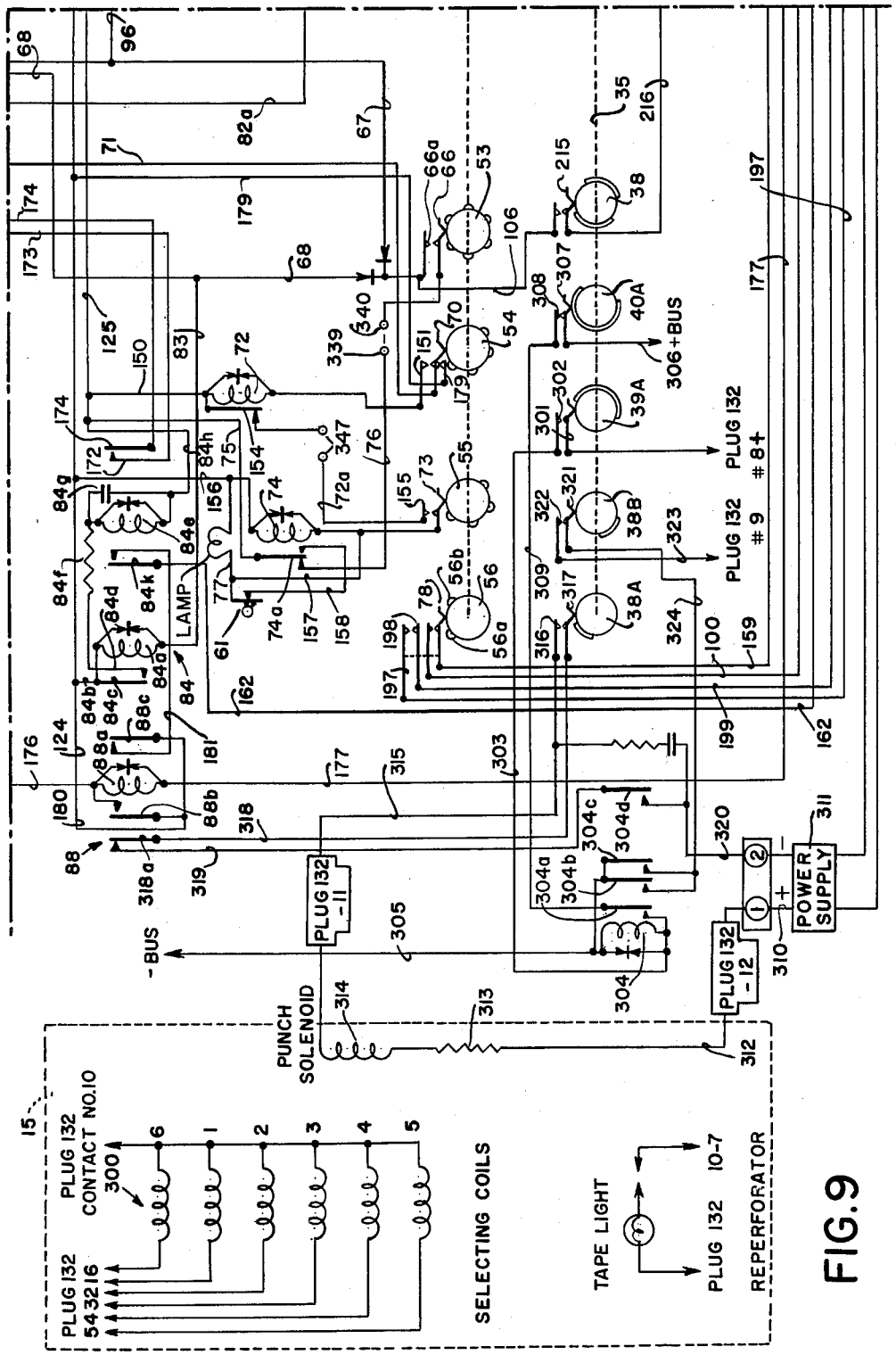

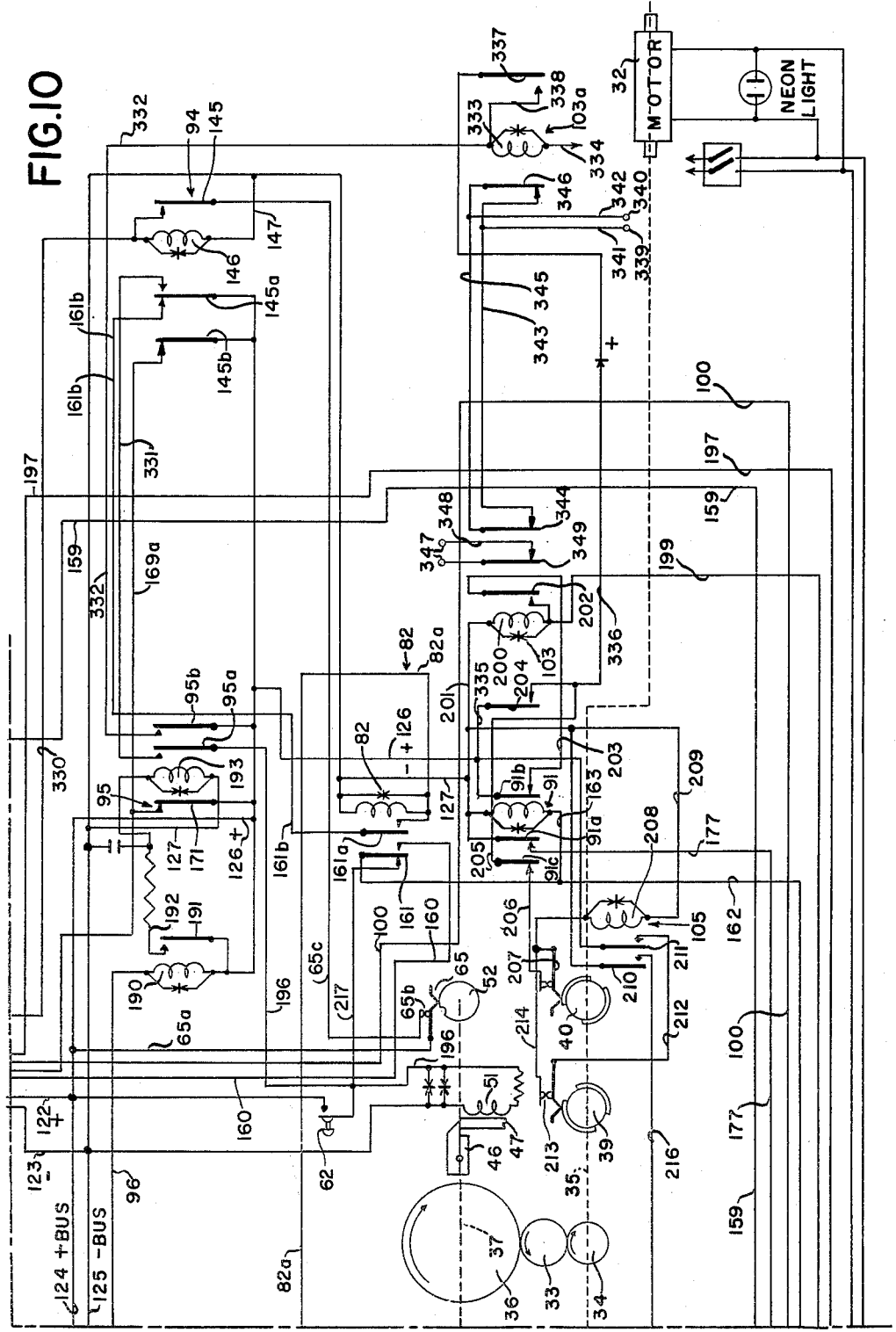

United States Patent Office 2,973,897
Patented Mar. 7, 1961

2,973,897
PUNCHED TAPE CONTROL MECHANISM

Herbert L. Paulding, Port Washington, and Richard T. Yu, New York, N.Y., assignors to Dow Jones & Company, Inc., New York, N.Y., a corporation of Delaware Filed Feb. 13, 1956, Ser. No. 565,202
19 Claims. (Cl. 234—3)

This invention relates to a system for controlling the operation of a device for punching or perforating a tape in accordance with a predetermined code for subsequent use of the tape in the control of a line casting machine, such as the types sold under the names Linotype and Intertype. The punched tape may be utilized in the control of such machines in accordance with the disclosure of either of the patents to J. J. Ackell Nos. 2,704,595 and 2,704,596, granted March 22, 1955, or in accordance with the disclosure of the J. J. Ackell application, Serial No. 522,209, filed July 15, 1955, now Patent No. 2,846,055, granted August 5, 1958.

As disclosed in the pending application of H. L. Paulding and Richard T. Yu, Serial No. 433,982, filed June 2, 1954, now Patent No. 2,788,886, granted April 16, 1957, it is desirable at times to control the operation of a line casting machine alternately from a plurality of different tapes. This is particularly useful in situations in which a part of the information to be set up on the line casting machine is available at an earlier time than other parts of the information which must be interspersed with that available at the earlier time. An important example of such a situation is the publication of stock quotations with all of the information usually provided. Some of this information is based upon the past performance of the various stocks, such as their high and low prices prior to the day in question. This information is available at the close of the preceding day and may be set up on a punched tape at any time thereafter as, for example, in the morning of the current day. Other information, such as the high, low and closing quotations for the day is available only at the close of the market on the current day. By the use of the system disclosed in said Paulding et al. application this limited part of the information which concerns only those stocks which have been traded in during the day may be very quickly set up on a separate tape with the result that a much earlier publication of the stock information may take place after the close of the market for the day than if all of the data with respect to each stock is set up on the tape after the close of the market. This is accomplished by alternately controlling the line casting machine from one tape and then the other for each line to be set up. Normally no information is published on a particular day with respect to a stock which has not been traded in during that day. Accordingly, provision is made in the system disclosed in the Paulding et al. application for eliminating from the matter to be set up in the line casting machine certain of the information contained on the first tape mentioned which, for convenience, is called the "standing tape." Thus if a particular stock has not been traded in during the day the information with respect to it on the standing tape is not transmitted to the line casting machine. Also provision is made for comparing code numbers assigned to the various stocks to make certain that the two tapes are in synchronism, that is, the data to be transmitted to the line casting machine from the two tapes pertains to the same stock. The arrangement is such that if the code number designations in the two tapes which are compared as a preliminary to the transmission of the pertinent information to the line casting machine do not coincide, the system is thrown out of operation and a signal is given to draw the operator's attention to the discrepancy.

While the foregoing system is highly satisfactory for use at a particular point of publication of a newspaper or the like, the equipment required is rather complicated and expensive and is of such a character as to require expert care and servicing in the event that any part of the system should fail to operate properly for any reason. Accordingly, concerns having a number of publications intended to be printed substantially simultaneously in different localities, with the same information, have found it unduly expensive to provide and service duplicate equipment of the character discussed above at each of the locations involved.

It has been the primary purpose of the present invention to provide in large measure the advantages of the foregoing system at a plurality of scattered locations without the necessity of duplicating the expensive equipment and with the attendant advantage of eliminating the servicing problem. This is accomplished by utilizing a special adaptation of the equipment, briefly described above, at only one of the plurality of locations to produce a single punched tape by reperforation under control of two or more tapes and by subsequently controlling a reperforator at each of the other localities in a conventional manner from the single combined tape produced at the first point. Toward this end there is provided a control system for a reperforator which compares code designations on a plurality of tapes to insure proper coordination of the tapes and then in response to an appropriate signal in the second or so-called "variable tape" the reperforator is controlled to produce a new combined tape containing firstly the information on the standing tape and then that on the variable tape for each line to be subsequently formed in the line casting machine under control of the new combined tape. The combined tape omits the stock code number designations appearing on the standing and variable tapes and it also omits some of the perforations in the two tapes identified with line feed (Lf) and carriage return (Cr). These are required for the control of a telegraphic printer which is usually operated at the distant point simultaneously with the perforation of a tape there to correspond with the combined tape at the original location. The Lf signal is also required to control the operation of the elevator of a line casting machine. For these purposes it is necessary only to duplicate these perforations in the combined tape when they appear at the end of a line of information carried by the variable tape.

A special feature of the invention is the provision of means by which a special signal in the variable tape, which indicates that a particular item is not to be cast, as when a particular stock has not been active during the day, will eliminate the code number comparing cycles and will bring about rapid stepping of the standing tape until the next item is reached. This greatly speeds up the operation of the system and enables earlier publication of the desired information.

Other changes in the circuits and the devices for controlling the same as disclosed in said Paulding et al. application are incorporated in the new system to speed up the operation of the reperforator. For example, in the system of said pending application 7 lines of perforations are assigned to the code number comparing sections of each tape, whereas in accordance with the present invention only 6 such lines of perforations are required. This enables higher speed operation of the system as a whole.

In achieving the foregoing ends the present invention utilizes a special control unit having two rotary shafts each supplied with a plurality of control cams. One shaft is constantly driven at relatively high speed, while the other shaft is driven one revolution at a time at a slower speed, preferably about one-eighth the angular speed of the first shaft, when the code designations in the two tapes are being compared. By virtue of a variety of changes in the control unit, as compared with that disclosed in the Paulding et al. application, the operation of the system as a whole is speeded up and provision is made for controlling certain functions of the reperforator. This is, in part, achieved by the provision of a greater number of control cams on the constantly driven shaft of the control unit. Also certain cams are provided with two lobes or segments, instead of one, to speed up certain controls by the constantly rotating shaft. Thus for each revolution of this shaft the tapes of the several tape boxes may be advanced twice.

Some of the changes incorporated in the new control system, such as the elimination of code number comparing when a signal in the variable tape indicates that information as to a certain stock is to be skipped or rejected, may be incorporated in a system for controlling a line casting machine from two different tapes.

Other objects, features, and advantages of the invention will appear from the detailed description of an illustrative embodiment of the same which will now be given in conjunction with the accompanying drawings, in which.

Figure 5:
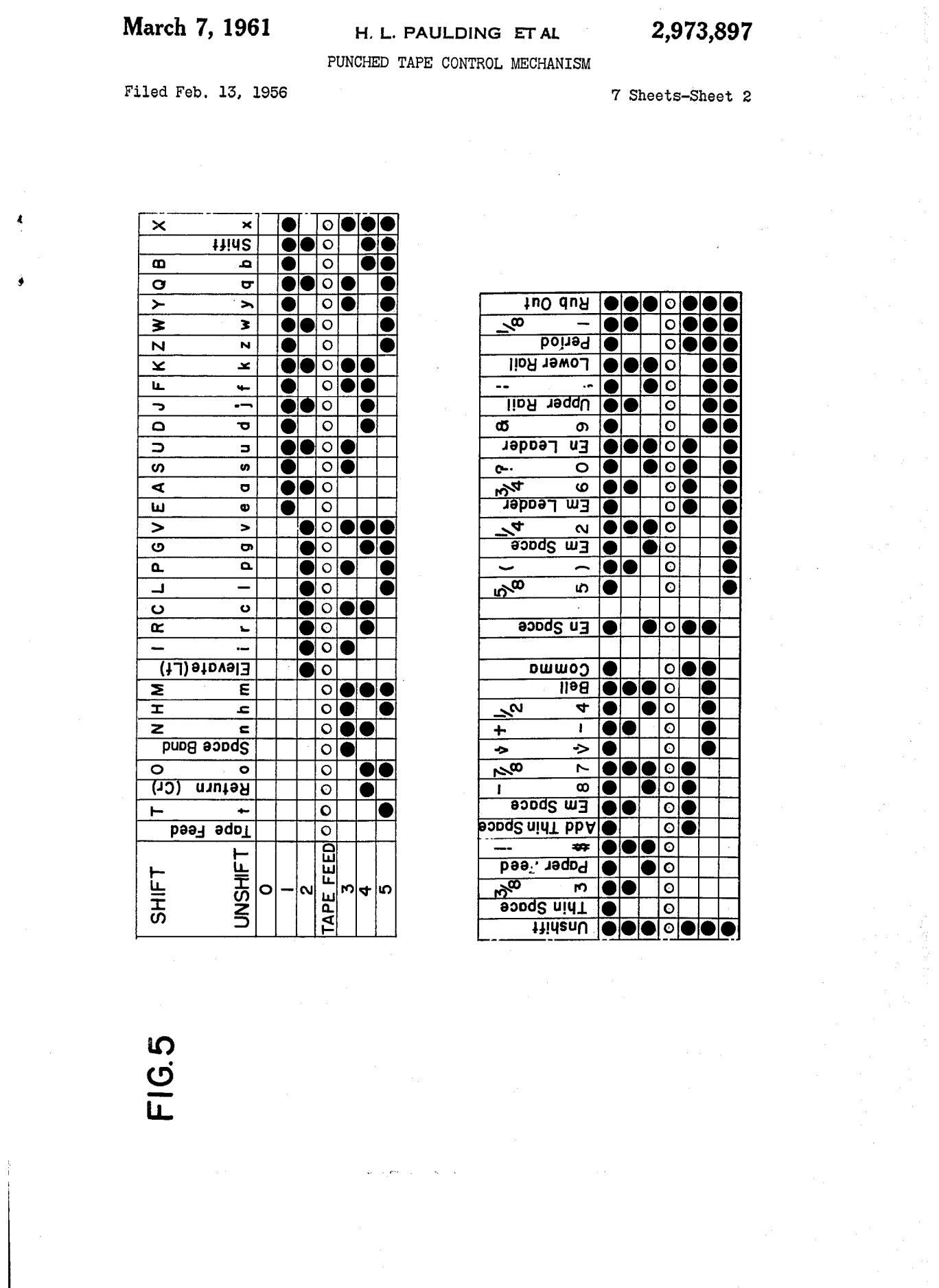
Figure 6:
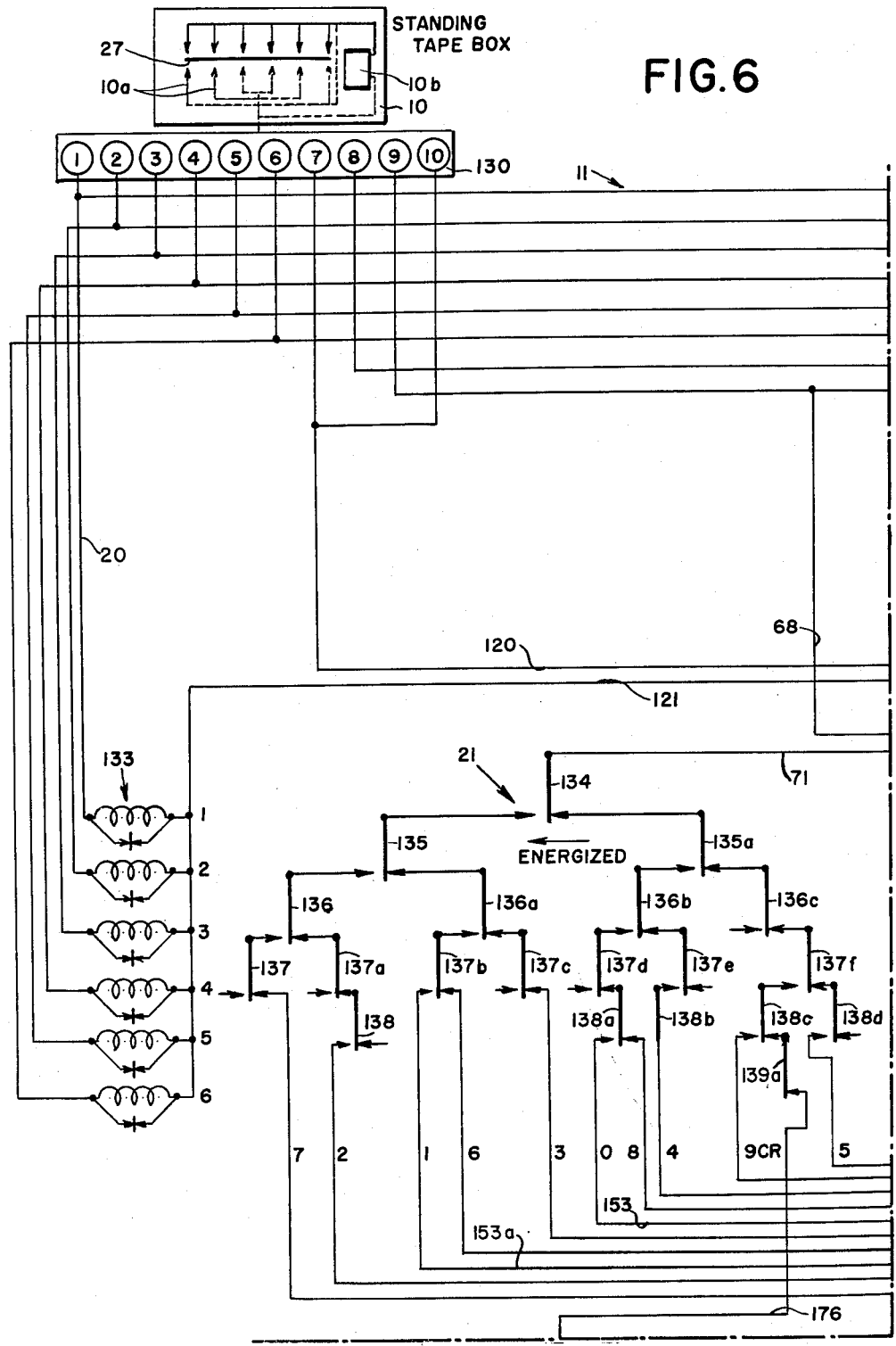
Figure 7:
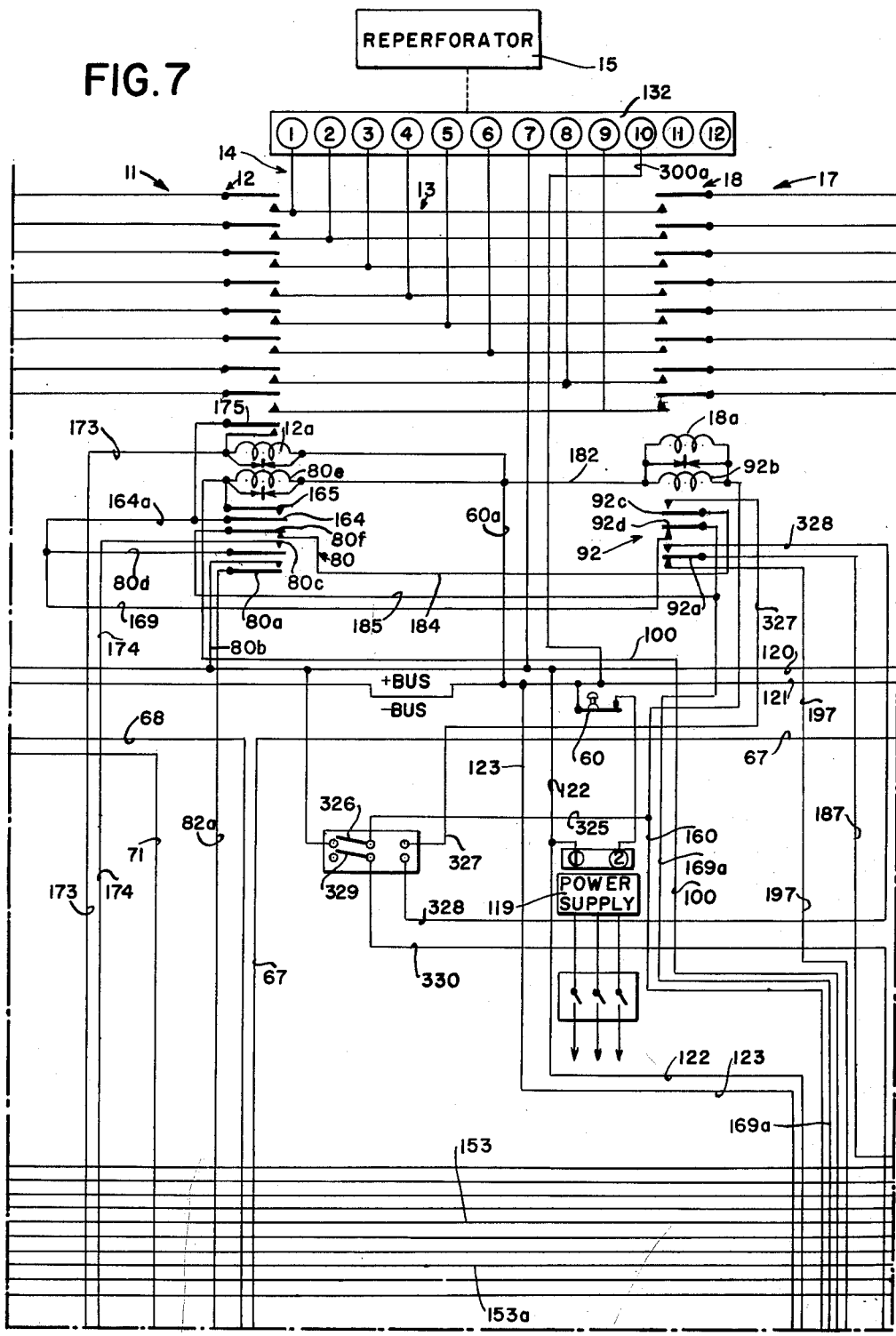
Figure 8:
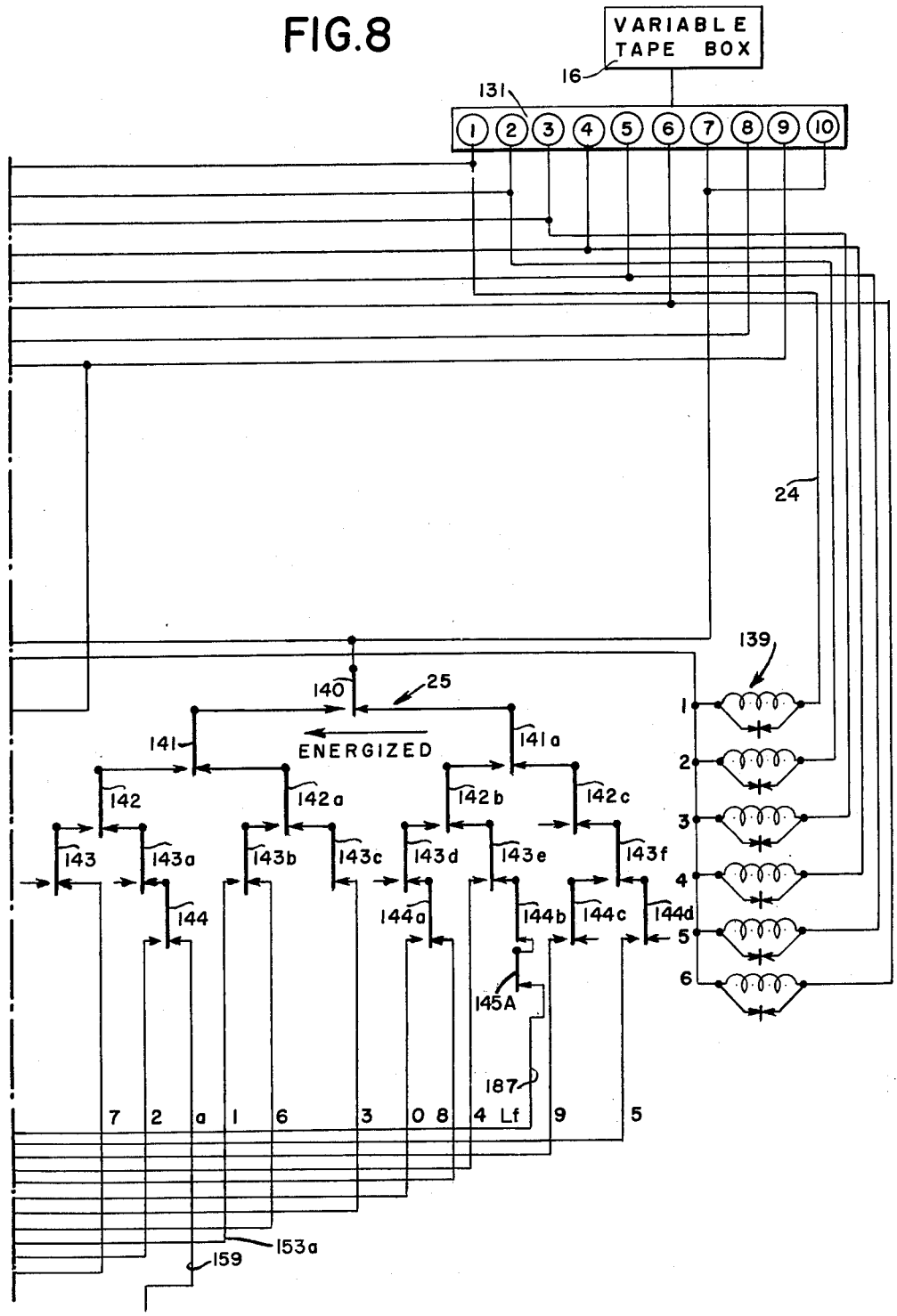

Fig. 5 is a chart indicating the co-relation between various lines of perforation across the tape and the characters or special controls which they designate; and Figs. 6 to 10 when combined disclose the circuits involved in the new control system; to provide the complete circuit diagram Figs. 6, 7, and 8 should be placed in side by side relation with their longer dimensions disposed vertically, and Figs. 9 and 10 should be positioned, with their longer dimensions disposed horizontally, directly beneath Figs. 6 to 8.

Figure 1:
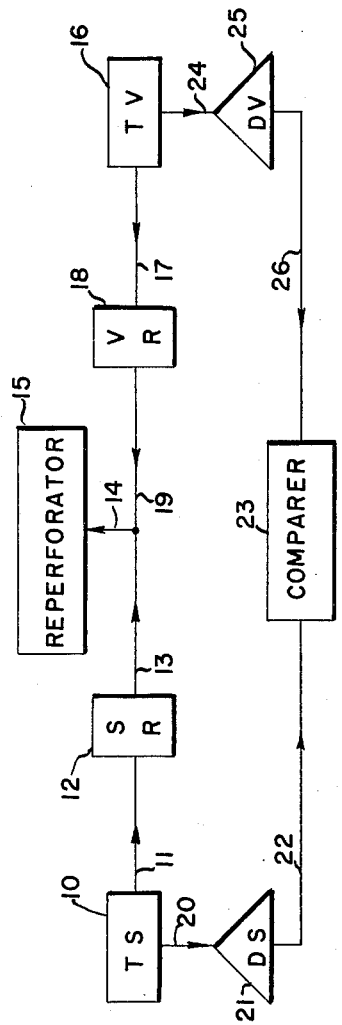
Fig. 1 is a simple schematic view illustrating in a general way the component parts of the system.

Turning now to Fig. 1, the system is provided with a tape box 10 with the usual tape feeding and tape analyzing devices identified with the standing tape. This box is connected by eight wires of a cable 11 with a relay system 12 for the standing tape, which is in turn connected by a cable 13 and a further cable 14 with a reperforator 15. A second tape box 16 similar to tape box 10 is provided for advancing and analyzing the variable tape. This tape box is connected by eight wires of a cable 17 with a relay system 18 identified with the variable tape. Relay system 18 is connected by a cable 19 with the cable 14 and in turn with the reperforator.

Tape box 10 is connected by another cable 20, having six wires, with a system of relays 21 forming part of a decoding means for the code designations on the standing tape. This decoding relay system is connected by a cable 22 with a comparing and controlling unit 23. Similarly the tape box 16 is connected by a cable 24 with a decoding relay system 25 adapted to decode the perforations identified with the code designations on the variable tape. Decoder 25 is, in turn, connected by a cable 26 with the comparing unit 23. As previously explained, the arrangement is such that if the circuits closed through the action of the decoder 21 do not correspond with the circuits closed through the portion of the decoder 25, as these are compared by the unit 23, the entire system will be automatically thrown out of operation and a signal, such has a red light, will be flashed to advise the attendant that readjustment of the system should be effected.

Assuming that the code designations analyzed by the decoders 21 and 25 correspond correctly, and assuming further that decoder 25 transmits an "accept signal," suitable relays in the system will serve to throw the control from the standing tape box 10 over to the relay system 12 so that the data represented by the holes punched in the standing tape will be transmitted to the reperforator. When the data identified with the particular stock designated by the decoded code number has been transmitted to the reperforator and punched in a new tape, the final signal transmitted from the tape box 10 will swing the control of the reperforator over to the tape box 16. The variable data, represented by the perforations in the tape passing through the tape box 16, will then be transmitted to the reperforator and punched in the new tape which has received data with respect to the same stock from the standing tape. Also the $Cr$ signal will be transmitted to the reperforator since it is required in the combined tape to cause return of the carriage of a telegraphic printer controlled by the combined tape. The final ($Lf$) of the variable tape is likewise transmitted to the reperforator since it later not only controls a telegraphic printer but it also will serve to bring about the operation of the elevator on the line casting machine when the combined tape formed by the reperforator is used to control such a machine. It will also serve to control various relays of the present system to restore the parts to their initial condition and to bring about a repetition of the decoding and comparing of the code designations on the standing and variable tapes.

It should be explained that the complete system is provided with a plurality of holding circuits which serve to retain various relays in their operated positions, until they are released by appropriate releasing signals transmitted from one part of the system to another. Also it should be understood that appropriate delays are incorporated in certain of the relay operating circuits of the system to provide the appropriate time lapse needed for certain of the operations. Certain circuit protecting devices are also included.

Figure 3:
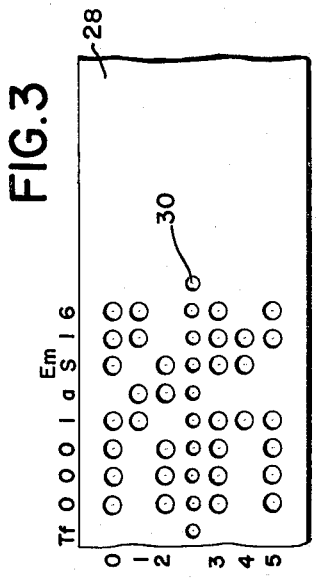
Fig. 3 shows a section of the variable tape.
Figure 2:
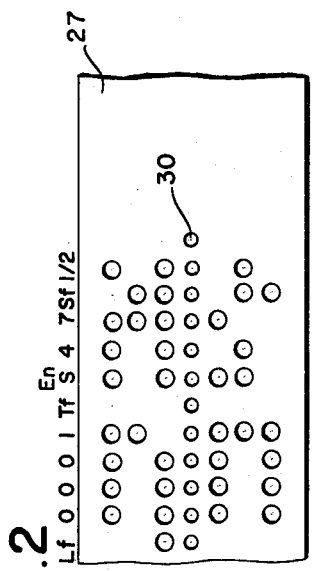
Fig. 2 shows a section of the standing tape.
Figure 4:
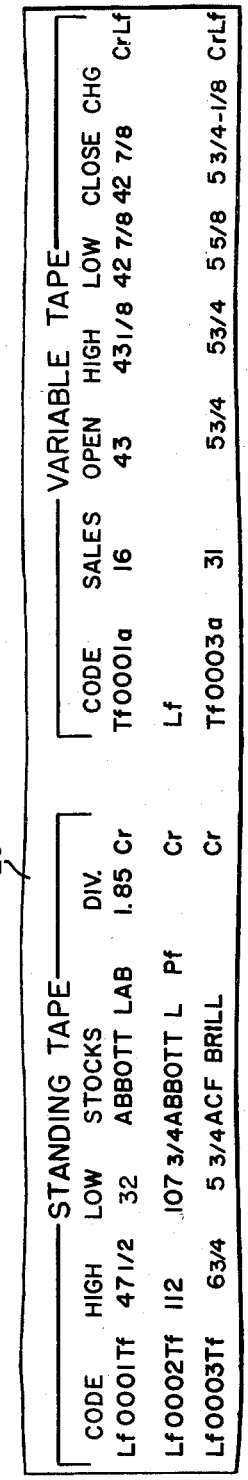
Fig. 4 shows a record sheet of the type produced on a telegraphic printer which is normally operated in the course of punching the standing and variable tapes.

In Figs. 2, 3, and 4 there are shown, respectively, a portion 27 of the standing tape, a portion 28 of the variable tape, and a portion 29 of the record strip bearing the matter printed by the telegraphic printer simultaneously with the punching of the standing and variable tapes. It should be understood, however, that the symbols "$Lf$," "$Tf$," "$a$," and "$Cr$," shown in Fig. 4, are not actually printed by the telegraphic printer. They are shown in Fig. 4 simply to indicate the functions that are controlled by the corresponding signals that are being transmitted at the particular points involved, in the operation of the system. The record strip 29 is produced in two parts; that identified with the standing tape being printed during the morning, for example, as the standing tape is being punched, and that identified with the variable tape being printed shortly after the close of the market on a particular day as the variable tape is being punched. If desired, the same record strip may be passed through the telegraphic printer twice to receive the full information, or two separate record strips may be formed and placed side by side to bring about the combined record indicated in Fig. 4. The two record strips may be pasted or otherwise secured to a supporting strip or sheet for convenience in checking the information set up on the tape which is punched by the reperforator.

Each of the punched tapes has a series of small holes 30 extending longitudinally along the center line thereof for tape feeding purposes. On each side of the tape feeding openings 30 there may be as many as three perforations alined therewith to identify the character to be printed or function to be controlled as a particular line across the tape is brought into the path of the analyzer or feeler pins of the related tape box. The perforations shown in Figs. 2 and 3 correspond with the data recorded for the first stock indicated on the printed record 29. Each tape has six successive positions or lines of perforations identified with the code. However, only the second, third, fourth and fifth lines or positions are actually involved in the code number which may be any number from 1 to 9999, each stock being assigned a particular number within this series. The first line or position on the standing tape corresponds with a line feed signal (Lf) to the telegraphic printer employed in the course of punching the tape, to advance the record strip one line. It should be explained that the positions of the perforations across the tape are considered herein as numbered 0, 1, 2, 3, 4, and 5 from the top to bottom of the tape in Fig. 2. This will be in a direction from top to bottom of the tape as it is moving horizontally across the plane in which the feeler pins are disposed. In the first line across the variable tape there are no perforations and there is simply an idle feeding of the tape. The next four positions on both tapes are identified with the code number of the particular stock with which the portions of the two tapes illustrated are identified. The last of the six code positions on the standing tape is simply blank, except for the tape feed aperture, so that the standing tape box 10 exerts no control as this position is fed past the analyzer pins. However, the corresponding position, i.e. sixth line of perforations on the variable tape 28 is identified with an "accept signal" which prepares the system for the transfer of control from the two tape boxes to the reperforator for controlling the setting up of the information concerning the stock in question on a line to be cast by the typesetter. The first signal transmitted to the reperforator from the standing tape is an En space signal since the high value of the stock involves only two whole digits. This signal causes a corresponding group of perforations to be formed in the new tape of the reperforator. Each of the succeeding lines of perforations in the standing tape will be similarly duplicated in the tape of the reperforator up to the end of the data relating to the particular stock in question. As will be understood the standing tape is advanced step by step until all of the data concerned with the particular stock in question is transmitted to the reperforator and when this has been completed a carriage return signal (Cr) is represented by the perforations in the tape. This exerts no control over the reperforator but is required for the control of the telegraphic printer, which as explained is in operation as the original tape is being punched. Upon the analyzing of the carriage return perforation in the standing tape, i.e. a single perforation in position 4, the relay circuits switch the control over to the variable tape and bring about the successive advance of this until the lines of perforations identified with the data relating to the number 0001 stock is set up on the tape in the reperforator. Upon completion of the setting up of this data a carriage return signal is called for by the perforations in the variable tape and this is preferably transmitted to the reperforator to enable the new tape to control a telegraphic printer at a distant point simultaneously with the perforation of a tape there. The final line of perforations in the variable tape identified with the stock in question calls for a line feed signal which is identified with that function in the telegraphic printer and is also transmitted to the reperforator since it is used in the subsequent control of a line casting machine, upon the analyzing of the new tape, to bring about the operation of the elevator of the machine.

By way of explanation of certain notations appearing in Figs. 2 and 3, it is explained that the notation EmS means Em space and the line of perforations so designated will coincide with a spacing movement of the carriage of the telegraphic printer and will bring about release of an Em space matrix in the electrotypesetter. The designation EnS stands for En space, and the perforations so identified bring about a corresponding result. While no designation for a space band appears in Figs. 2 and 3, it may be mentioned that the presence of perforations so identified in Fig. 5 would bring about the production of an appropriate spacing of the matter to be printed. Perforations may also be provided which bring about a shift from lower case to upper case and the like, while perforations may be provided which provide an unshift signal which restores the controls to the production of lower case characters and the like. The location of the perforations for these signals are indicated in Fig. 5. It should be understood in this connection that the shift signal brings about the printing of fractions instead of whole numbers when certain number keys are depressed. Another combination of perforations stands for Em leader. Fig. 5 shows the arrangement of perforations for each of the characters and signals involved in the control of a line casting machine.

Before turning to the actual circuits involved in the new control system for a combining reperforator it should be explained that the system embodies a cam or commutator unit of the general type disclosed in the above mentioned Paulding et al. application. Its mechanical construction may be similar and is not disclosed herein but the various shafts and cams embodied in it are schematically shown in Figs. 9 and 10. It is shown as involving a gear 33 driven by a motor 32 and this gear meshes with a pinion 34 secured to a shaft 35 for continuously rotating the latter. Gear 33 also drives a gear 36 which has a slip clutch connection with a shaft 37. Shaft 35 carries a plurality of cam elements 38, 39, 40, 38A, 38B, 39A and 40A arranged to operate certain switches at predetermined times during the rotation of the shaft. Shaft 37 is normally held against rotation by an arm 46 secured thereto which cooperates with a detent 47. The latter is arranged to be retracted by means of an electromagnet or solenoid 51 when the latter is energized upon the completion of certain circuits, at appropriate times, to permit a single revolution of the shaft 37. This shaft carries a plurality of cams 52, 53, 54, 55 and 56 arranged to operate various switches at appropriate times during a revolution of the shaft. The shaft 35 is driven at a much higher angular speed than the shaft 37. Its angular speed may, for example, be eight times that of the shaft 37 or even more, because of the nature of the functions which it performs.

As best shown in Fig. 10, the cam 52 is provided with a single depression which becomes effective at the beginning of rotation of the shaft 37 to operate its related switch momentarily. The cam 53 is provided with six bumps which operate successively on a switch member to bring about stepping of the tapes in the two tape boxes six times during a revolution of the shaft 37. During the intervals between each stepping of the tape, the analyzing pins or fingers in the tape boxes will be operated to control the necessary relays for comparing the code numbers on the two tapes and for performing other functions. The cams 54 and 55 each have four bumps which operate related switches to close certain circuits during the comparing of the four digits of the code number appearing in each of the tapes. The projections of the cam 54 are of somewhat greater circumferential length than those of the cam 55 so as to retain the related switch in closed position over a somewhat longer period of time. Cam 54 becomes active in advance of cam 55 and remains active for a short interval after the cam 55 has released its switch arm. The cam 56 has a bump 56a which is effective at the beginning of the rotation of shaft 37 when a signal in the variable tape, i.e. an Lf signal in the first position on this tape, determines that the related data is to be skipped and not transmitted to the reperforator. Cam 56 has a second bump 56b which becomes effective toward the end of the rotation of the shaft 37 to operate a switch which sets into operation certain devices for accepting the data represented by the subsequent perforations in the standing tape and then those in the variable tape to cause their reproduction in the new combined tape.

The driving connections for the shafts 35 and 37 are such that shaft 35 is rotated at a considerably higher speed than shaft 37. As stated, its angular speed may suitably be eight or more times that of shaft 37. This is to enable rapid stepping of the standing tape whenever the data following the code identification is not to be transmitted to the reperforator. The arrangement is such that under these circumstances the tape will be stepped twice upon each revolution of the shaft. As has been explained, this occurs whenever the particular stock with respect to which information is about to be printed has not been traded in during the day. The appearance of the L$f$ signal in the first position of the code designation on the variable tape serves to reject the related data on the standing tape and swings the control over the movements of the latter to the cams on the shaft 35. Some of these cams are also effective during the operation of the reperforator.

With the foregoing general explanation of the operation of the system, the various relays and circuits involved in a preferred embodiment of the invention will now be described in greater detail in relation to Figs. 6 to 10 inclusive. These figures form parts of a single circuit diagram which illustrates schematically the interconnection between the various parts of the system. To create the complete circuit, Figs. 6, 7, and 8 should be placed side by side with their longer dimensions disposed vertically, and Figs. 9 and 10 should be disposed horizontally, or transversely, at the lower edges of the other three figures.

There is shown in these figures the standing tape box 10, the cable 11 extending therefrom to the relay system 12 for the standing tape, and the cables 13 and 14 from the latter extending to the reperforator 15. Similarly the variable tape box 16 is shown connected by a cable 17 with the relay system 18 for the variable tape, which is connected by the cables 13 and 14 with the reperforator.

Power for operating the system is derived from a suitable direct current source 119 (Fig. 7) which delivers current to various bus lines in the system. These bus lines include the positive line 120 and negative line 121, which are in turn connected through lines 122 and 123 respectively with bus lines 124 and 125 (Fig. 10). The latter are in turn connected through lines 126 and 127 with other points in the system.

Tape box 10 is connected with the cable 11 by means of a Jones plug 130 having ten contact elements. Similarly, tape box 16 is connected with cable 17 by means of a Jones plug 131 having ten contact elements. Cable 14 is connected with the reperforator through a Jones plug 132 having twelve contact elements.

It will be noted that the contact elements numbered 1 to 6 and 8 to 9, inclusive, of Jones plug 130 are connected with separate switch arms in the relay unit 12. The first six of these contact elements are connected with respective ones of the six feeler pins 10a in the tape box 10. It will be understood that as the tape in the box is analyzed, certain ones of the feeler pins will pass through perforations in the tape to complete circuits through the corresponding contact elements of the Jones plug. Those contact elements numbered 1 to 6 are also connected through the cable 20 with respective ones of six solenoids 133 embodied in the decoder 21. The contact numbered 6 is connected with the analyzer pin cooperating with the 0 line of perforations in the tape. All of the numbers 0 to 9 are represented by lines of perforations which include one in the 0 position. Therefore the feeler pin for that position is not arranged to operate any switch arms in the decoder identified with those numbers. Only one switch arm in each decoder unit is operated as a result of a 0 perforation in the corresponding tape and this arm is identified with a control circuit. The relationship between the perforations and the various symbols to be printed, and functions to be controlled, is indicated in Fig. 5. Each of the solenoids 133 serves to operate one or more related switch arms in the relay system embodied in the decoder. Thus the solenoid numbered 1 of this group operates a switch arm 134 to shift this toward the left. Normally switch arm 134 is in engagement with the contact indicated by the arrow at the right of it. However, when operated by the solenoid it is brought into engagement with the contact at the left. Similarly, solenoid No. 2 of the group 133 operate any switch arms in the decoded identified with those their right hand contacts to their left hand contacts. Solenoid No. 3 shifts the four switch arms 136, 136a, 136b, and 136c from their right hand contacts into engagement with their left hand contacts. Solenoid No. 4 shifts switch arms 137, 137a, 137b, 137c, 137d, 137e, and 137f from their right hand contacts to their left hand contacts. Solenoid No. 5 shifts switch arms 138, 138a, 138b, 138c, and 138d from their right hand contacts to their left hand contacts and solenoid No. 6 shifts arm 139a away from the contact shown at its lower end. Depending upon which of the solenoids may be operated upon analyzing the perforations along a particular line in the tape, the various switch arms of the relay system 21 will assume predetermined positions which at times will serve to complete one or another of a plurality of circuits. Contact elements numbered 7 and 10 of plug 130 are connected to positive bus line 120.

In a similar way the eight contacts numbered 1 to 6 and 8 to 9 of the Jones plug 131 will be connected through the cable 17 with the relay system 18 for appropriate control of the reperforator when the relay system 18 is properly conditioned for such control. Contacts 1 to 6, inclusive, are connected with respective ones of six feeler pins in the box 16 in the manner indicated for box 10, contact 6 being identified with the 0 perforations in the tape. Other contacts are connected and a tape stepping and feeler pin retracting magnet, as in the case of box 10. Contacts 1 to 6 of Jones plug 131 are also connected through cable 24 with respective ones of a group of solenoids 139. Each of these is arranged to operate one or more switch arms in the decoder 25 for the variable tape. Solenoid No. 1 operates switch arm 140 to shift it from the right hand contact to the left hand contact. Solenoid No. 2 similarly operates switch arms 141 and 141a. Solenoid No. 3 operates switch arms 142-142c. Solenoid No. 4 operates switch arms 143-143f, solenoid No. 5 operates switch arms 144-144d, and solenoid No. 6 operates a switch arm 145A to carry it away from the contact shown adjacent its lower end. Contact elements numbered 7 and 10 of plug 131 are connected to positive bus line 120.

A large number of other relays are included in the system and it should be understood that the various switch arms of these relays are normally spring biased in a direction away from the coils indicated for these relays. This may be referred to as the normal or released condition of the relays. When these relays are energized the various switch arms are to be considered as shifted toward the coils into engagement with the contacts in the direction of the coils. A plurality of holding circuits are included in the system for retaining certain of the switch arms in their attracted, or non-normal positions when they are shifted in response to the closing of various circuits.

*Starting operations*

Now assuming that the system has been in operation and is connected with the power source 119, but the operation of the system has been interrupted or stopped for some reason, it is set into operation by first momentarily opening switches 60 and 61 (Figs. 7 and 9) to release certain of the holding circuits. Switch 62 (Fig. 10) which is normally open is then operated momentarily to set the system into operation. Closing of this switch momentarily delivers current to the magnet 51 from positive line 122 by way of switch 62 and line 196 and back to the source through negative line 123. Upon operation of the magnet 51, the shaft 37 will be released for operation through the friction driving means explained above. As soon as the shaft 37 starts to turn, the depression in cam 52 will cause switch arm 65 to drop and break the connection between contacts 65b. This will break the circuit from bus line 124 through a line 65a, switch arm 65 and line 65c to a switch arm 145 of a relay 94, which was at this time being held against the contact shown, the holding circuit for relay 94 being active at the time; this holding circuit was previously completed through coil 146 and line 147 to the negative bus line 125. Breaking of the circuit through the solenoid 146 in this manner will cause the several switch arms 145, 145a, and 145b of relay 94 to shift away from the coil 146 into the position shown, i.e. this relay will be released.

Code comparing operation

Simultaneously the feeler pins in the two tape boxes 10 and 16 will be operated to sense the perforations in the two tapes then alined with the feeler pins. The tape in the standing box, as indicated in Fig. 2 will, in the first line, have a single perforation in the No. 2 position which is identified with line feed (Lf). This has no significance in relation to the control system under discussion. It is of significance only in the control of the telegraphic printer which, as explained, is operated simultaneously with the formation of the original punched tape. The variable tape has no perforations in the first line in any of the six positions indicated. It is simply provided with a small tape feeding opening at the center of the tape. This performs no function in the control system under discussion and is identified only with the tape feeding function in the course of forming the punched tape simultaneously with the printing of a record on a telegraphic printer.

After a sufficient time has elapsed for the sensing operation of the two tape boxes, the first bump on the cam 53 (Fig. 9) will engage the switch arm 66 to close the contacts 66a and complete a circuit which will bring about operation of the tape feeding magnets in the two tape boxes. This circuit is completed as follows: from the negative bus line 125, through line 75, then the switch arm 74a of the relay 74 and the line 76 to the switch arm 66. Points 339 and 340 in line 76 will be connected at this time, but under different conditions, to be later explained, the circuit will be broken here. From the arm 66, parallel circuits extend through lines 67 and 68 to the contacts numbered 9 of the Jones plugs connected with the variable tape and standing tape boxes, respectively. From the contacts 9 the circuit passes through the tape feeding magnets, that in box 10 being indicated at 10b, and then to the contact numbered 7 in each box, this contact being connected into the positive bus line 120. The tape stepping magnets first serve to retract the feeler pins and then impart a single step of advance to the two tapes; the feeler pins are then released for spring actuation to sense the perforations in the tapes for the second line of perforations identified with the six code positions. While the feeler pins are so operated to sense the second line of perforations, the first bump on the cam 54 will lift the switch arm 70 into engagement with a contact at the end of a line 151 which is connected through the solenoid of the relay 72 and a line 150 to the negative bus line 125. Assuming that the tape perforations are as shown in Figs. 2 and 3 there will be perforations in the 0, 2, 3, and 5 positions on both tapes. This will bring about operation of the solenoids numbered 2, 3, 5 and 6 in the groups 133 and 139. A circuit will thus be completed from the switch arm 70 through line 71, switch arms 134, 135a, 136b, 137d and 138a to the line marked 0 in Fig. 6. From this point the circuit continues through a line 153 to the line marked 0 in the decoder for the variable tape (Fig. 8). From here the circuit extends through switch arms 144a, 143d, 142b, 141a, and 140 to the positive bus line 120. Since this indicates proper correspondence between the code number perforations in the two tapes and a circuit is completed through the solenoid of relay 72, a switch arm 154 of the latter will be operated to break a connection which normally exists from negative bus line 125 through line 150, arm 154, and line 72a to a contact 155. Points 347 in line 72a will at this time be interconnected but, as will be later explained, the circuit will be broken here under special circumstances.

Stopping of system when code designations do not conform

Let us now assume that the perforations in the two tapes do not coincide at the particular points in the code designations being analyzed and compared. The circuit through the decoding units 21 and 25 and through the solenoid of relay 72 will not be completed. Therefore the arm 154 will remain engaged with the contact at the end of line 72a. A circuit will then be completed from the negative bus line 125 through line 150, switch arm 154 to contacts 155 which will be engaged by the switch arm 73 as the first bump on the cam 55 engages this switch arm. This will occur shortly after the first bump on cam 54 has engaged and lifted switch arm 70 and while the latter remains lifted. Under the assumed conditions, closing of the circuit between contacts 155 and switch arm 73 will pass current through the solenoid of relay 74 and through line 156 to the positive bus line 124. Simultaneously a circuit is completed from arm 73 through line 157 and the lamp 77 to line 156 and the bus line 124. In energizing the relay 74 a circuit will be completed from the positive bus line 124 through line 156, then through the red light 77, and a parallel path through the solenoid of relay 74 and line 157, thence the arm of switch 61 and a line 158 to a switch arm 74a which will have been shifted toward the right by the operation of the relay 74. The circuit is completed from this point through the line 75 to the negative bus line 125. This last described circuit serves as a holding circuit for relay 74. The operation of the relay 74 serves to break the tape stepping circuit which, as previously explained, involves the line 75, switch arm 74a and line 76. This circuit will be broken between the switch arm 74a and line 76. Accordingly, further operation of the system will be arrested and the red light 77 will remain on until the operator corrects the difficulty.

Continued operation when code numbers coincide

Now returning to the first assumption, in which the perforations being compared in the two tapes have coincided, the relay 72 will have been energized and the relay 74 will not have been energized, so that upon the engagement of the second bump on the cam 53 with the switch arm 66 the two tapes will be advanced another step in the manner explained, and the feeler pins of the two tape boxes will analyze the next or third line of holes in the tapes. Assuming this line is as indicated in Figs. 2 and 3, another circuit will be completed through the zero lines of the two decoders and the tapes will be advanced again. This will be repeated for the fourth positions on the tapes. Again assuming that the tapes coincide, the engagement of the fourth bump on the cam 53 with the switch arm 66 will shift the tapes to present the fifth line of perforations in the path of the feeler pins, and at this time a circuit will be completed through a different path in the decoding relays 21 and 25 as the fourth bump on the cam 54 operates switch arm 70. This new path, which corresponds with the digit 1, extends from the switch arm 134 through arm 135, arm 136a, arm 137b, to line 1 and thence through a line 153a to the line marked 1 in the decoder 25. From here the circuit is completed through switch arms 143b, 142a, 141 and 140 to the positive bus line 120.

*The "accept" signal and related operations*

As the operation of the comparing unit continues, the fifth bump on the cam 53 will bring into the path of the feeler pins for the two tapes the sixth line of perforations. In the standing tape there is simply a tape feeding perforation in this line and this is ineffective to close any circuit in the system. In the variable tape the feeler pins will pass through apertures in the 1 and 2 positions which correspond with the "accept" signal "a." It should be noted in this connection that while no circuit is completed from the decoder 21 to the decoder 25 through the relay 72 as above described, the circuits for stepping the tape in the two tape boxes will not be broken at the arm 74a since there is no bump at this particular position on the cam 55 to operate switch arm 73 and close a circuit through relay 74. Accordingly, the tapes will be advanced when the next bump on the cam 53 operates the switch arm 66. Now returning to the circuit which is completed by the "accept" signal in the variable tape, this signal will throw the switch arms in the decoder 25 to connect the bus line 120 with the line marked "a." From this point the circuit will extend through line 159 to the switch arm 78 which cooperates with the cam 56. The bump 56b on this cam will, at this time, operate the switch arm 78 to complete the circuit with the contact shown directly above it, the circuit then extending through line 100 downwardly then over to the right and upwardly to the coil 80e of relay 80. From here the circuit will be completed through the line 60a to the negative bus line 121.

In thus completing the circuit through the coil of relay 80 to the negative bus line 121, certain holding circuits will be energized. Thus, a switch arm 164 of relay 80 will be operated to engage a contact 165. This will complete a holding circuit through the solenoid of the relay 80 which may be traced from negative line 121 through line 60a to the solenoid of relay 80, contact 165, arm 164, lines 164a and 169 (Fig. 7), thence through the arm 92d of relay 92, over and down through line 169a and parallel switch arms 145b and 171 to the positive line 126. At this time also the relay 82 will be energized. The circuit for this purpose extends from the negative bus line 127 through the solenoid of relay 82 to a line 82a which extends upwardly to the relay 80 and is connected with a switch arm 80a in the latter. This switch arm at the time is in its operated position and engages a contact at the end of a line 80b which is connected to the positive bus line 120. As a result of actuation of the relay 82 its two switch arms 161 and 161a are shifted toward the right. This sets up a holding circuit from negative line 127 through the coil of relay 82 then through arm 161a and a line 161b to arm 145a of relay 94 back to positive line 126.

Now upon engagement of the sixth bump on the cam 53 with the switch arm 66, the usual circuits will be completed to the tape stepping magnets in the two tape boxes. At the same time a circuit will be completed through one of the relays in group 84 (Fig. 9). This circuit is as follows: from the negative bus line 125 through line 75, switch arm 74a and line 76 to the switch arm 66, thence from the latter through line 68 to a line 83 through the coil 84a in the group of relays 84 and thence through a line 84b to the positive bus line 124. The current thus flowing through coil 84a will cause the arm 84c to engage a contact at the end of line 84d. This will complete a circuit through the coil 84e of the relay group 84 as follows: from the positive bus line 124 through line 84b, switch arm 84c, line 84d, a resistance 84f, preferably of about 150 ohms, then through coil 84e, and in parallel therewith through condenser 84g. The circuit then continues through a line 84h to the negative bus line 125. Actuation of the switch arms in the relay group 84 completes a circuit through the solenoid of the relay group 12. This circuit may be traced so follows: from the negative bus line 121 (Fig. 7) through 60a to and through the coil 12a of relay group 12, thence through a line 173 to a contact which at this time is engaged by a switch arm 172 in the relay group 84, through the latter to a line 174 which extends to the relay 80. Since the switch arm 80c in the latter will at this time be engaged with a contact at the end of line 174, the circuit continues through line 80d which is connected with line 169 and through the latter is connected with switch arm 92d of relay 92. From here the circuit extends downwardly through line 169a to the switch arm 145b of relay 94 which is connected with the positive bus line 126. The circuit through the coil 12a is held by the operation of a switch arm 175 which at this time is shifted downwardly to close the contacts shown and thereby connects the left end of the coil to the line 164a which completes the circuit through lines 169 and 169a, in the manner explained, to the positive line 126.

Operation of the relay 12 by completing the circuit through coil 12a in the manner explained will serve to rock all of the switch arms in the relay downwardly to connect the eight lines in the cable 11 from the Jones plug 130 to the corresponding contacts in the Jones plug 132. This serves to place the reperforator under the control of the standing tape box 10. Each time one of the analyzer pins of tape box 10 is made active by passing through a perforation in the standing tape, it will bring about the operation of a corresponding selector in the reperforator. For convenience in shortening certain of the circuits involved, the reperforator has been duplicated in Fig. 9 and shown in broken lines. The six arrows designated 5, 4, 3, 2, 1 and 6 are connected with the corresponding contacts of the Jones plug 132 (Fig. 7). Under the circumstances now being described, they will, in turn, be connected through the cable 13, relay arms 12, and cable 11 with Jones plug 130 and through the latter with the corresponding pins of the analyzer in tape box 10. Any of the movable analyzer pins in this box which pass through perforations in the standing tape will complete a circuit as follows: From the positive bus line 120 (Fig. 6) through the No. 10 contact of plug 130 which is connected with the several analyzer pins in box 10. Those pins which cooperate with perforations in the tape then carry the circuit through the corresponding contacts of Jones plug 130 over to a corresponding contact of Jones plug 132 to the selected one or ones of the six coils 300 in the reperforator 15. From these coils the circuit extends to contact 10 of Jones plug 132 and from the latter through a line 300A to the negative bus line 121. Any of the solenoids 300 which are thus energized will operate suitable selectors, of known character, which will cause the corresponding punches to be effective in perforating the tape in the reperforator upon the energizing of the punch solenoid in the manner to be described.

Referring now to Fig. 9, the cam 39A becomes effective under the circumstances now being considered, i.e. after the relay 12 has been operated to connect the standing tape box with the reperforator. The switch arm 301 which is arranged to be actuated by the commutator segment on cam 39A is connected with the number 8 contact of Jones plug 132. The latter is, in turn, connected with the number 8 contact of Jones plug 130 in view of the energizing of relay 12. Contact 8 of plug 130 is connected with the positive side of the current source. Accordingly, under the conditions mentioned the switch arm 301 is connected with a positive line. When the switch arm is raised it engages contact 302 at the end of a line 303, the opposite end of which is connected with a relay coil 304 whose opposite side is connected by a line 305 with the negative side of the current source, thus completing a circuit. When the relay 304 is thus energized switch arms 304a, 304b, 304c, and 304d are drawn toward the left into engagement with the contacts indicated. Arm 304a forms part of a holding circuit for the relay 304. This circuit extends from a positive bus line 306 through switch arm 307, contact 308, line 309, arm 304a, coil 304, and line 305 to the negative bus line. It will be understood that this circuit is completed only so long as the commutator segment of cam 40A serves to lift the switch arm 307. The cams 39A and 40A have an overlapping relationship at both ends so that once the relay 304 is energized, it remains energized by a circuit controlled by one or another of these cams until the circuit is broken between contact 8 on the Jones plug 132 and the positive line, i.e. it is broken if neither of relays 12 and 18 is energized. Also it is clear that relay 304 must be initially energized by cam 39A and then held by cam 40A and it will not be deenergized so long as cam 40A lifts the switch arm 307; it can only be deenergized when cam 39A is lifting the switch arm 301.

Now while the selected coils 300 in the reperforator 15 are energized to select one or more punches for operation in accordance with the perforations being analyzed in the standing tape, the punch actuating solenoid of the reperforator will be operated on each revolution of the shaft 35. The circuit by which this is accomplished will now be traced. The positive side 310 of a power supply 311 is connected through a line 312 and a resistance 313 with one side of the punch actuating solenoid 314. The opposite side of the latter is connected by a line 315 with a contact 316 arranged to be engaged by a switch 317 when the latter is lifted by the segment on cam 38A. From the switch arm 317 the circuit continues through line 318, switch arm 318a, and line 319 to the arm 304d which, at this time, will be shifted toward the left into engagement with the contact shown at the upper end of the negative bus line 320. Energizing of the punch solenoid 314 in this way serves to operate the punch mechanism to duplicate in the reperforator the perforations being sensed in the standing tape. On the return movement of the punch mechanism a tape feeding action will be imparted to the tape in the reperforator to prepare the latter for the next punching operation. During this interval, or subsequent thereto, a tape stepping impulse will be imparted to the solenoid 10b in the standing tape box 10. This is by the action of cam 38B which will now act upon a switch arm 321 to carry it into engagement with a contact 322. The latter is connected by a line 323 to contact 9 in Jones plug 132 which, in turn, is connected with contact 9 of plug 130 at this time. This, as explained above, is the contact through which a tape stepping pulse is transmitted to the tape box 10. The circuit is completed from the switch arm 321 to the negative side of the line through a line 324 and switch arms 304b and 304c which are, at this time, held toward the left in engagement with contacts on line 324. As shown, switch 304b is connected through line 305 with the negative bus line.

It will be understood that the cams 38A and 38B will act repeatedly to close the circuits described to bring about the operation of the punch in the reperforator and the subsequent advance of the tapes in the reperforator and in the boxes 10 and 16. This will continue until all of the data regarding the particular stock in question has been transmitted to the reperforator. Thus the data (Fig. 4) relative to the stock No. 0001 will be set up in the tape of the reperforator until the Cr signal is reached at the end of this data on the standing tape. It will be understood that the circuits from the tape box 10 to the decoder 21 will be effective at all times to shift the switch arms of decoder 21 in accordance with the perforations in the tape, but in the setting up of the data prior to the Cr signal no circuit will be completed through the various switch arms of decoder 21. However, when the Cr signal is transmitted to the decoder the single perforation in the number 4 position identified with this signal will throw the switch arms 137-137f toward the left while the remaining switch arms in the decoder will remain in their righthand positions. This will complete a circuit to the line 176 marked Cr in the drawing. That circuit may be traced as follows: from line 176 which extends to and through coil 88a of relay 88, then through line 177 over to switch arm 91a of relay 91, which at this time will be inactive. From arm 91a the circuit extends to the negative bus line 127. In the opposite direction from the line 176 the circuit extends through switch arms 139a, 138c, 137f, 136c, 135a, and 134 to line 71 which is connected with the switch arm 70 (Fig. 9). The latter is at this time engaged with the lower contact at the end of a line 179 which extends upwardly to the positive bus line 124. It will be noted that a circuit is thus completed through the relay 88 and this will swing a switch arm 88b in the latter into engagement with the contact shown and thus complete a holding circuit for the relay. This may be traced from the positive bus line 124 through line 180 and through arm 88b and coil 88a to line 177 which, as indicated before, extends through arm 91a of relay 91 to negative bus line 127. In thus operating relay 88 and setting up a holding circuit therefor, the system will be placed in readiness for release of the relay unit 12 and relay 80 upon the final stepping of the tape in the tape box 10 under control of the cam 38B.

Energizing of the relay 88 will break the circuit controlled by cam 38A for operating the punch solenoid 314. This is because the arm 318a of relay 88 will be drawn toward the right and break the connection with the line 319. However, the circuit for operating the tape advancing means of the box 10 remains active for operation upon the next camming action of the lobe of cam 38B on the switch arm 321. The circuit for operating the tape advancing means of box 10 at this time extends from the negative bus connected with line 305 (Fig. 9) through the arm 304b, line 324, arm 321, contact 322, and line 323 to the number 9 contact of Jones plug 132. The latter, as explained, is at this time connected, through relay 12, with contact 9 of plug 130 which is connected into the tape stepping magnet 10b, the opposite side of which is connected to contact 7 of plug 130 which extends to the positive line 120.

In parallel with the foregoing circuit there is another circuit extending from the line in cable 11 which interconnects the contacts 9 of the plugs 130 and 132. This line is connected by line 68 with a line 83 (Fig. 9) which extends to one end of the coil 84a of relay group 84. From the opposite end of this coil the circuit is completed through line 84b to the positive line 124. Upon energizing of coil 84a arm 84c will be drawn toward the right to complete a circuit through coil 84e of relay group 84. This circuit extends from positive line 124 through line 84b, arm 84c, line 84d, resistance 84f, through coil 84e, and then through line 84h to negative line 125. Energizing of the coil 84e will complete a circuit through relay 91 (Fig. 10). This circuit extends from positive line 124 through line 180, arm 88c, which is at this time drawn toward the left, line 181, arm 84k, which is at this time drawn toward the right, line 162 and line 163 through the coil of relay 91 to the negative bus line 127. Energizing of relay 91 in this manner breaks the holding circuit through the relay 88 which, as explained above, involves the arm 91a of relay 91 and the line 177. Arm 91a will, at this time, be drawn toward the right to break this circuit. Upon release of relay 88 the arm 318a will return to its lefthand position, so that the circuit controlled by cam 38a for operating punch solenoid 314 will again be active.

Simultaneously with the energizing of relay 91, relays 18 and 92 will also be energized. Thus the circuit from the positive line which has been traced through line 162 to the line 163 continues beyond the latter to an arm 161 of relay 82. This arm is, at the time, shifted toward the right since relay 82 is energized. Accordingly, the circuit will continue through line 160 to and through the coils 18a and 92b, in parallel, these being the coils of the relays 18 and 92. From the opposite ends of these coils the circuit continues through line 182 to the line 60a down to the negative bus line 121. Energizing of relay 92 in this manner serves to break the holding circuits for the relays 12 and 80 which, as explained, include the arm 92d of relay 92. This arm is lifted from the contact at the end of line 169 to break the circuit through relays 12 and 80. A holding circuit for relays 80 and 92 is set up as follows: From the negative bus line 121 through line 60a, line 182, coils 18a and 92b, line 160, branch line 325, switch arm 326, which is at this time in its righthand position, then through line 327 to the arm 92c of relay 92. The latter will be in its lifted position in engagement with the contact at the end of line 327. From switch arm 92c the circuit continues through line 184 to the released switch arm 80f of relay 80 and then through line 185 to line 169a. The latter, as previously indicated, extends downwardly to complete the circuit to the positive bus line 126 through switch arms 145b and 171 of the relays 94 and 95.

With the relays 18 and 92 thus energized and held, the control over the reperforator is now shifted to the tape box 16 and the matter appearing on the variable tape with respect to stock number 0001 will be transmitted to the reperforator and the punching and tape feeding operations will be controlled again by the action of the cams 38A and 38B in the manner explained in relation to the control of the reperforator from the tape in the box 10.

It will be understood that the selecting coils 300 of the reperforator will at this time be energized in accordance with the successive lines of perforations in the variable tape to reproduce corresponding lines of perforations in the reperforator. The operation of the cam 38A to close the punch solenoid circuit is the same as before. The circuit closed by the cam 38B for stepping the tape in the variable tape box will be similar to that explained in relation to box 10 but, of course, the line 323 which is connected with the No. 9 contact of Jones plug 132 will now be connected with the No. 9 contact of Jones plug 131 to complete the circuit through the tape feeding magnet of box 16 to the No. 7 contact of the latter as the bump on cam 38b actuates the switch 321. The duplication of perforations in the combined tape of the reperforator will continue through the Cr signal of the variable tape since the latter is needed in the combined tape to control the carriage return of the telegraphic printer which is to be operated at the distant point upon analyzing the combined tape to produce a duplicate tape at the distant point.

The final Lf signal identified with the 0001 stock in the variable tape, which is needed as an elevator lifting signal for the electrotypesetter to be controlled by the combined tape and also as a line feed signal for the telegraphic printer to be controlled by the combined tape, is also transmitted to the reperforator in the same manner as the other signals. However, in addition it sets up circuits for the ultimate release of relays 18 and 92 and the restoration of the system to the condition initially described to enable the various functions to be performed in relation to the next item on the two tapes. For this purpose the Lf signal completes a circuit through the decoder 25 to a line 187 identified as Lf. As shown in Fig. 5 the Lf signal involves a single perforation in the No. 2 position. Therefore the circuit from positive line 120 extends through switch arms 140, 141a, 142b, 143e, 144b and 145A to the line 187. From this point the circuit extends to the left and upwardly to the arm 92a of relay 92, this arm being at the time in its elevated position in engagement with a contact at the end of a line 328. The latter continues the circuit to the arm 329 of the double throw switch shown and from the latter through line 330 to the coil 146 of relay 94. The opposite side of this coil is connected through line 147 to the negative line 127. Thus relay 94 is energized and a holding circuit is set up for this relay. The holding circuit extends from position line 124 through line 65a, switch arm 65, contacts 65b, line 65c to arm 145 of relay 94, which is at this time shifted toward the left into engagement with the contact at the upper end of coil 146, the lower end of this coil, as explained, being connected into the negative line 127. Energizing of relay 94 releases relay 82. This is because the holding circuit for the latter extends through the arm 145a of relay 94 which will now be shifted toward the right away from the contact at the end of line 161b forming part of the holding circuit for relay 82. Also it will be noted that arm 145b will be shifted toward the right out of engagement with the contact at the end of line 169a. Therefore, one of the paths from the line 169a to the positive line 126 forming part of the holding circuit for the relays 18 and 92 will be broken. However, the other path through arm 171 of relay 95 will still be active so that relays 18 and 92 will not yet be released. Such release will come about upon the operation of the tape feeding magnet in the variable tape box 16 which takes place through the action of the cam 38B on shaft 35. As the lobe on this cam lifts the switch arm 321 into engagement with contact 322, it provides a negative connection from the line 305, in the manner previously explained, to the line 323 which is connected with the No. 9 contact of the Jones plug 132. The latter, in turn, is connected through cable 17 with contact No. 9 of Jones plug 131. From the latter the circuit extends through the tape stepping magnet of box 17 to the No. 7 contact of plug 131 which is connected with the positive bus line. The tape in box 16 is thus advanced a step. Another circuit is also completed in parallel with the foregoing from contact No. 9. This contact, as previously explained, is connected with line 67, which, as shown in Figs. 9 and 10, has a branch line 96 extending over to a relay coil 190, the opposite terminal of which is connected into the positive line 126. Energizing of relay coil 190 in this way will draw the switch arm 191 toward the left and will complete a circuit from positive line 126 through arm 191 and line 192 to the coil 193 of relay 95. The opposite side of coil 193 is connected with the negative line 127. Thus relay 95 is energized and the arm 171 thereof is drawn toward the right, thereby breaking the other path from line 169a forming part of the holding circuit for the relays 18 and 92. The latter relays will, accordingly, be released.

Release of relay 18 will bring about the release of relay 304 (Fig. 9) and thus throw the cams 38A, 38B, 39A and 40A on shaft 35 out of control. This is due to the fact that the line extending from switch arm 301 which cooperates with cam 39A is connected to the No. 8 contact of Jones plug 132. The latter has up to this time been connected with a positive line through the action of either relay 12 or relay 18. Thus prior to the release of relay 18 the No. 8 contact of plug 132 is connected through cable 17 with the No. 8 contact of tape box 16 and through the latter is connected with a positive line. However, when relay 18 is released the switch arm 301 is no longer connected with a positive line through this path. Accordingly, after the cam 40A permits the switch arm 307 to drop, the circuit through the coil 304 will no longer be completed since cam 39A will no longer be effective for this purpose. Release of relay coil 304 causes the several arms 304a, 304b, 304c, and 304d to shift toward the right and thus break the various circuits controlled by cams 38A, 38B, and 40A.

The system is thus restored to its initial condition and is ready for the operation of the magnet 51 to bring about release of the shaft 37 for another revolution to compare the next group of code designations on the two tapes. Operation of magnet 51 is automatically brought about at this time by virtue of the energizing of relay 95 and the previous release of relay 82. The circuit through the magnet 51 extends from the positive line 126 through arm 145a of relay 94 which is, at this time, energized so that the arm is engaged with a contact at the end of a line 331 whose opposite end is engaged by an arm 95a of the relay 95. This arm is connected with a line 196 which extends over to one end of the magnet 51. The opposite end of this magnet is connected with the negative line 125. A resistor-condenser circuit is incorporated with relay 95 for necessary momentary holding and time delay just as in the case of relay group 84. Just as in the first cycle of shaft 37 described above, the first thing which occurs in the new cycle is the release of relay 94, by breaking the holding circuit for the latter at the contacts 65b. If the code numbers in the two tapes coincide and if the code of the variable tape ends with an "accept" signal, the control of the reperforator, first by the standing tape and then by the variable tape, will be repeated. The system will continue to operate in this way automatically so long as the code designations in the two tapes correspond and the variable tape carries the accept signal for the successive stock code numbers. We have already described what takes place in the event that the code numbers in the two tapes do not coincide.

*The "reject" signal and related operations*

Let us now consider what takes place when the variable tape has a "reject signal" in lieu of an "accept signal" for a particular stock identified by the code perforations. The shaft 37 will be released, as in the normal case, for one revolution to initiate the comparison of the two code numbers. However, as shown in Fig. 4 in relation to stock No. 0002, when the first line of perforations in the two tapes identified with the code designation is brought into line with the feeler pins a line feed signal will be transmitted by the variable tape. This will close a circuit from the positive bus line 120 through the arms 140, 141a, 142b, 143e, 144b and 145A of the decoder 25 to the line 187. The latter will continue the circuit through the arm 92a of relay 92 which at this time will be in its released condition. From here the circuit continues through a line 197 down and then over to a contact disposed adjacent the cam 56 on the shaft 37. While the circuit is thus completed up to this point, the bump 56a on cam 56 will lift the switch arm 198 to engage its contact with that at the end of line 197 and will thus complete the circuit through line 199, coil 200 of relay 103, and line 201 to the negative line 127. Upon energizing the relay 103 in this manner the arm 202 will be drawn toward the left and will thus complete a holding circuit from negative line 127 through line 201, coil 200, arm 202, line 203, arm 91b of relay 91, which at this time is in released condition, then to positive line 126. Another circuit is also completed from positive line 126 through switch arm 204, to a line 205 connected with arm 91c of relay 91, and from the latter through line 206 and switch arm 207 to the coil 208 of relay 105, from which the circuit is completed through line 209 to the negative line 127. This circuit is completed only when either of the two high parts of cam or commutator disk 40 engages and lifts the arm 207. When relay 105 is thus energized, it draws the arms 210 and 211 toward the right into engagement with the indicated contacts. A holding circuit is then completed through the coil 208 of relay 105 through the combined, overlapping action of commutator disks 39 and 40. When cam 40 is not effective, the cam 39 will be effective through a circuit from the positive line 126, through arm 211, line 212, contacts 213, which are at this time held closed by one or the other of the segments on commutator 39, then through line 214 and coil 208 to line 209 connected into the negative line 127. Closing of the switch arm 210 completes a circuit for the stepping of the standing tape twice upon each revolution of the continuously driven shaft which carries the commutator disks 38, 39, 40. As each of the segments of commutator disk 38 lifts a switch arm 215, a tape stepping circuit is completed as follows: from negative line 127 through arm 210, a line 216, switch arm 215 to the line 106 which is connected into line 68 extending upwardly to the ninth prong on the Jones plug 130. From here the circuit is completed through the tape stepping magnet of box 10 to the terminal 7 which, as explained, is connected into positive bus line 120.

Rapid stepping of the standing tape will thus take place twice upon each revolution of the shaft 35 carrying the commutator disks 38, 39 and 40 until the Cr signal is reached at the end of the information on the standing tape relating to the particular stock in question. When that signal is reached a circuit will be completed in the manner previously explained through the decoding relay system 21 to the line 176, this circuit then extending through the coil of relay 88 and through line 177 to and through the arm 91a of relay 91 to the negative line 127. The connection from positive bus line 124 to the decoding relay unit 21 is through line 179, switch arm 70, and line 71. Operation of relay 88 causes arms 88b and 88c to be drawn against their contacts. Arm 88b thus creates a holding circuit through the coil 88a, in the manner explained, from the positive bus line 124 through line 177 and switch arm 91a to the negative line 127. Upon the next tape stepping pulse created by the cam 38 the relays of group 84 will be energized. The circuit through coil 84a will at this time be from positive bus line 124 through the coil, then lines 83, 68 and 106, arm 215, line 216, and arm 210 to the negative line 127. Coil 84e is energized by a circuit from positive line 124 through line 84b, arm 84c, line 84d, resistance 84f, coil 84e, and line 84h to negative bus line 125. Operation of relay group 84 and previous operation of the arm 88c closes a circuit from the positive bus line 124 through the line 181, arm 84k, line 162, line 163, and the coil of relay 91 to the negative line 127, thus operating relay 91. The operation of relay 91 serves to release relay 88 since the circuit through the coil of the latter is then broken by the attraction of the arm 91a away from the contact at the end of line 177. In addition, the operation of relay 91 serves to break the holding circuit through the coil 200 of relay 103 at switch arm 91b and thus releases this relay. Relay 105 is also released at this time due to the energizing of relay 91 which breaks the circuit for 105 at arm 91c and interrupts the high speed stepping of the standing tape under control of the cam 38. This can occur only during an interval in which cam 40 is holding the relay 105 in energized condition and not when it is being held by cam 39. Simultaneously with the energizing of the relay 91, a circuit is completed through the coil of magnet 51 to release the shaft 37 for another revolution and thus set in motion the next code designation comparing operation. The circuit through the coil of magnet 51, which starts this new cycle, continues from the positive side of the power source, through line 162, arm 161 of the now released relay 82, through lines 217 and 196 to one side of the magnet 51, the opposite side of the magnet being connected with the negative bus line 123.

When the Lf signal is provided in the first position of the code designation in the variable tape to bring about the rejection or skipping from the combined tape of the data relating to a particular stock and also bring about the fast stepping of the standing tape, it is necessary or desirable to eliminate certain of the functions that would otherwise be performed by the shaft 37 during the particular cycle in question. This shaft will, of course, complete the revolution that has been initiated but its control over the stepping of the tapes in the boxes 10 and 16 should be eliminated after the first tape feed pulse that has been described. Suitable circuits are provided, in accordance with the invention, for preventing further stepping of the tapes under control of the cam 53 so that the variable tape will not be advanced further during the rotation of the shaft 37 while the standing tape will be advanced only under the control of cam 38.

The foregoing is achieved as follows: When the first bump on cam 53 at this time lifts the switch arm 66 to impart a tape stepping movement to the tape in the variable tape box 16, the line 67 will, as previously indicated, be connected into the negative bus line 125 in the manner explained. A branch circuit from this negative line will extend through line 96 and then through coil 190 to positive line 126. Energizing of coil 190 will, as previously explained, energize coil 193 of relay 95. This occurs upon each stepping of the tape in the variable tape box, but the circuits set up will exert controls over the system only at certain times. The situation now under discussion is one of those times. As the coil 193 is energized a switch arm 95b will be drawn toward the left to connect the positive line 126 with a contact at the lower end of a line 332. The latter extends over to a coil 333 of a relay 103a (Fig. 10), the opposite side of which is connected with a negative bus line 334. This circuit will be set up upon each energization of relay 95, but it will have no effect unless the relay 103 has been energized. When this has been energized a holding circuit will be set up for the coil 333. This extends from the positive bus line 126 through a line 335 to the arm 204 which is, at this time, shifted toward the right by the energizing of coil 200. The circuit then continues through line 336 to switch arm 337 which has been shifted toward the left by energizing of the coil 333. From here the circuit is completed through line 338, coil 333 to the negative bus line 334. Thus relay 103a will remain energized so long as relay 103 is energized.

When both of the relays 103 and 103A are thus energized the circuit normally closed upon the operation of the switch arm 66 by cam 53 is kept open. This is due to the fact that, as shown in Fig. 9, a gap is provided between points 339 and 340 in the line 76 at this time. These points are for convenience duplicated adjacent the relay 103A in Fig. 10. As there shown they are connected through lines 341 and 342 with switches controlled by the relays 103 and 103A. Thus line 341 is connected with a line 343 which, so long as relay 103 is deenergized, completes a circuit through an arm 344 of this relay to a line 345 connected with line 342. Similarly lines 343 and 345 are connected by a switch arm 346 of relay 103A so long the latter is not energized. It is only when both of the relays 103 and 103A are energized that the tape stepping circuit is broken by the points 339 and 340 of line 76.

In the preferred arrangement the energizing of relay 103 also prevents the operation of the red light 77 as the perforations in the two tapes are being compared during the revolution of shaft 37. It will be recalled that the comparing of the perforations in the two tapes is controlled by the cams 54 and 55. When the perforations being compared coincide a circuit is completed through relay coil 72 to attract the arm 154 and thus break a circuit which would otherwise bring about operation of the light 77. On the other hand, when the perforations do not coincide relay 72 will not be energized and a circuit will be completed through relay 74 by the action of cam 55 and this will bring about operation of light 77. At the time now under consideration the perforations in the two tapes will not coincide but it is desirable to avoid operation of light 77. This is accomplished by interposing a break in the line 72a which is effective to prevent energizing of relay 74 whenever relay 103 is energized, even though relay 72 is not energized at this time. The break is indicated by the circles 347 in Fig. 9 and these are duplicated above relay 103 in Fig. 10. It will be seen that normally a circuit is completed between the two points through a line 348 and an arm 349 of relay 103. However, when relay 103 is energized arm 349 is drawn toward the left to break this connection and thus bring about the result explained.

The various conditions which may be encountered in the operation of the system have now been fully described. It will be understood that the various controls explained will come into operation as the perforations in the two tapes call for the different types of control. The system will operate automatically and continuously to set up all of the desired information in the combined tape of the reperforator represented by the perforations in the two tapes except under the conditions explained, when the two code numbers being compared do not correspond.

While an illustrative embodiment of the invention has been described in considerable detail, it will be understood that various changes and additions may be made without departing from the general principles and scope of the invention. Moreover, some of the features of the foregoing system which serve to speed up its operation may be incorporated in a system of the type disclosed in applicants' pending application Serial No. 433,982 to bring about more rapid operation of a line casting machine from two separate tapes which take alternate control over the line casting machine.

What is claimed is:

1. A control system for a tape punching device having therein a plurality of punches selectively operable either singly or in predetermined combinations and tape advancing and punch operating means, which comprises a plurality of perforated tapes each having successive groups of perforations in accordance with a predetermined code system, devices for separately advancing said tapes step by step and analyzing the successive groups of perforations therein, electrical circuits controlled by said perforated tapes for simultaneously selecting one or more punches to be operated and for operating said tape advancing and punch operating means of said tape punching device and for operating said tape advancing and analyzing devices, and means comprising a driven cam unit for closing certain of said circuits selected by one and then another of said perforated tapes in predetermined sequence, to thereby reproduce in the tape of said tape punching device the information represented by successive groups of perforations appearing in said plurality of perforated tapes.

2. A control system for a tape punching device having therein a plurality of punches selectively operable either singly or in predetermined combinations and tape advancing and punch operating means, which comprises a plurality of perforated tapes each having successive groups of perforations in accordance with a predetermined code system, devices for separately advancing said tapes step by step and analyzing the successive groups of perforations therein, electrical circuits controlled by said perforated tapes for simultaneously selecting, in accordance with said predetermined code system, certain of the punches to be operated and for operating said tape advancing and punch operating means of said tape punching device and for operating said tape advancing and analyzing devices, means comprising an electrically driven cam unit and a plurality of relays for closing certain of said circuits selected by one and then another of said perforated tapes in predetermined sequence to reproduce in the tape of said tape punching device successive groups of perforations appearing in said plurality of perforated tapes, and circuits controlled by one of said plurality of tapes for disabling certain of said first mentioned circuits and thereby eliminating from the tape in said punching device certain of the groups of perforations in another of said plurality of tapes.

3. A control system for a tape punching device having therein a plurality of punches selectively operable either singly or in predetermined combinations and tape advancing and punch operating means, which comprises a plurality of perforated tapes each having successive lines of perforations in accordance with a predetermined code system, devices for separately advancing said tapes step by step and analyzing the successive lines of perforations therein, electrical circuits controlled by said perforated tapes for simultaneously selecting certain of the punches to be operated and for operating said tape advancing and punch operating means of said tape punching device and for operating said tape advancing and analyzing devices, said simultaneously selected punches corresponding to a line of said perforations, and means comprising an electrically driven cam unit and a plurality of relays for closing certain of said circuits selected by one and then another of said perforated tapes in predetermined sequence, to thereby reproduce in the tape of said tape punching device successive lines of perforations appearing in said plurality of perforated tapes, said cam unit having a plurality of cam elements for controlling the operation of the tape advancing devices for at least one of said plurality of perforated tapes at three different speeds, the speed at which said tapes are advanced being determined by the electrical circuits closed under control of said perforated tapes.

4. A control system for a tape punching device having therein a plurality of punches selectively operable either singly or in predetermined combinations and tape advancing and punch operating means, which comprises a plurality of perforated tapes each having successive lines of perforations in accordance with a predetermined code system, devices for separately advancing said tapes step by step and analyzing the successive lines of perforations therein, electrical circuits controlled by said perforated tapes for simultaneously selecting one or more punches to be operated and for operating said tape advancing and punch operating means of said tape punching device and for operating said tape advancing and analyzing devices, and means comprising an electrically driven cam unit and a plurality of relays for closing certain of said circuits selected by one and then another of said perforated tapes in predetermined sequence, to thereby reproduce in the tape of said tape punching device the information represented by successive lines of perforations appearing in said plurality of perforated tapes, said cam unit having a plurality of cam elements for controlling the operation of the tape advancing devices for at least one of said plurality of perforated tapes at three different speeds, the speed at which said tapes are advanced being determined by the electrical circuits closed under control of said perforated tapes, one of said cams being intermittently driven for a single revolution to control the advance of said one tape at one speed and a pair of said cams being constantly driven to respectively control the advance of said one tape at a second and a third speed, said circuits predetermining which of said plurality of cams shall be effective during a particular revolution of said constantly driven cams.

5. A control system for a tape punching device having therein a plurality of punches selectively operable either singly or in predetermined combinations and tape advancing and punch operating means, which comprises a plurality of perforated tapes each having successive lines of perforations in accordance with a predetermined code system, devices for separately advancing said tapes step by step and analyzing the successive lines of perforations therein, electrical circuits controlled by said perforated tapes for simultaneously selecting, in accordance with said predetermined code system, certain of the punches to be operated and for operating said tape advancing and punch operating means of said tape punching device and for operating said tape advancing and analyzing devices, the certain punches which are thus simultaneously selected successively corresponding to successive lines of perforations appearing in said plurality of perforated tapes, and means comprising an electrically driven cam unit and a plurality of relays for closing certain of said circuits selected by one and then another of said perforated tapes in predetermined sequence, to thereby reproduce in the tape of said tape punching device successive lines of perforations appearing in said plurality of perforated tapes, said cam unit having a plurality of shafts, one driven intermittently for a single revolution and the other driven constantly at a higher speed than said intermittently driven shaft, a cam on said one shaft and a plurality of cams on said other shaft arranged to control operation of the tape advancing devices for said plurality of tapes, one of said plurality of cams being arranged to control operation of the tape advancing devices for at least one of said plurality of tapes a plurality of times upon a single revolution, said circuits being arranged to select the cam which is effective to control the operation of said tape advancing devices in accordance with the perforations in said plurality of tapes.

6. A control system for a tape punching device having therein a plurality of punches selectively operable either singly or in predetermined combinations and tape advancing and punch operating means, which comprises a plurality of perforated tapes each having successive lines of perforations in accordance with a predetermined code system, devices for separately advancing said tapes step by step and analyzing the successive lines of perforations therein, electrical circuits controlled by said perforated tapes for simultaneously selecting certain of the punches to be operated and for operating said tape advancing and punch operating means of said tape punching device and for operating said tape advancing and analyzing devices, the information represented by said simultaneously selected punches corresponding to the information represented by a line of said perforations, and means comprising an electrically driven cam unit and a plurality of relays for closing certain of said circuits selected by one and then another of said perforated tapes in predetermined sequence, to thereby reproduce in the tape of said tape punching device the information represented by successive lines of perforations appearing in said plurality of perforated tapes, said cam unit having a plurality of constantly driven cams arranged selectively to control the operation of said tape advancing devices for at least one of said plurality of tapes, said cams of said unit being arranged to cause operation of said devices at different speeds, and certain of said circuits selecting the cam of said plurality of cams which is effective at a particular time.

7. A control system for a tape punching device having therein a plurality of punches selectively operable either singly or in predetermined combinations and tape advancing and punch operating means, which comprises a plurality of perforated tapes each having successive lines of perforations in accordance with a predetermined code system, devices for separately advancing said tapes step by step and analyzing the successive lines of perforations therein, electrical circuits controlled by said perforated tapes for simultaneously selecting one or more punches to be operated and for operating said tape advancing and punch operating means of said tape punching device and for operating said tape advancing and analyzing devices, and means comprising an electrically driven cam unit and a plurality of relays for closing certain of said circuits selected by one and then another of said perforated tapes in predetermined sequence, to thereby reproduce in the tape of said tape punching device the information represented by successive lines of perforations appearing in said plurality of perforated tapes, said cam unit having a plurality of constantly driven cams arranged selectively to control the operation of said tape advancing devices for at least one of said plurality of tapes, said cams being arranged to cause operation of the tape advancing device for said one tape at different speeds, another constantly driven cam in said unit for controlling the operation of said tape advancing and punch operating means in said tape punching device only when one of said plurality of cams is effective.

8. A system for transmitting control signals to a device adapted to record successive items of information which comprises a plurality of control tapes each having groups of formations therein in accordance with a predetermined code system corresponding with a portion of each item of the information to be recorded, each of said tapes having also groups of formations in advance of each item represented by said first mentioned groups of formations to provide a code number for each item, separate means for advancing and analyzing each of said tapes, a plurality of electrical circuits interconnecting said separate means with each other and with said device, means in said circuits controlled by the formations in said tapes for selecting the circuits to be closed at periodic intervals, a cam unit having a plurality of switches for closing selected circuits at periodic intervals, the arrangement being such that the circuits which interconnect said separate means serve to compare the code number formations in the several tapes, means for disabling the system when the code numbers being compared do not coincide, and means in said circuits controlled by a formation group provided in one of said tapes in lieu of certain code number formations therein for preventing transmission of control signals to said device in relation to the item identified by said certain code number formations.

9. A system for transmitting control signals to a device adapted to record successive items of information in accordance with perforations arranged singly or in combinations, which comprises a plurality of perforated tapes each having groups of perforations in accordance with a predetermined code system corresponding with a portion of each item of the information to be recorded, each of said tapes having also groups of perforations in advance of each item represented by said first mentioned groups of perforations to provide a code number for each item, separate means for advancing and analyzing each of said tapes, a plurality of electrical circuits interconnecting said separate means with each other and with said device, means in said circuits controlled by the perforations in said tapes for selecting the circuits to be closed at periodic intervals, a cam unit having a plurality of switches for closing selected circuits at periodic intervals, the arrangement being such that the circuits which interconnect said separate means serve to compare the code number perforations in the several tapes, means for disabling the system when the code numbers being compared do not coincide, means in said circuits controlled by a perforation group provided in one of said tapes in lieu of certain code number perforations therein for preventing transmission of control signals to said device in relation to the item identified by said certain code number perforations, and means controlled by said cam unit for rapidly advancing another of said tapes when the transmission of control signals therefrom is prevented.

10. A system for transmitting control signals to a device adapted to record successive items of information in accordance with perforations arranged singly or in combinations, which comprises a plurality of perforated tapes each having groups of perforations in accordance with a predetermined code system corresponding with a portion of each item of the information to be recorded, each of said tapes having also groups of perforations in advance of each item represented by said first mentioned groups of perforations to provide a code number for each item, separate means for advancing and analyzing each of said tapes, a plurality of electrical circuits interconnecting said separate means with each other and with said device, means in said circuits controlled by the perforations in said tapes for selecting the circuits to be closed at periodic intervals, a cam unit having a plurality of switches for closing selected circuits at periodic intervals, the arrangement being such that the circuits which interconnect said separate means serve to compare the code number perforations in the several tapes, means for disabling the system when the code numbers being compared do not coincide, means in said circuits controlled by a perforation group provided in one of said tapes in lieu of certain code number perforations therein for preventing transmission of control signals to said device in relation to the item identified by said certain code number perforations, and means in said circuits controlled by a single perforation group in said one of said tapes following other code number perforations therein for causing the transmission of control signals to said device successively from said plurality of tapes in relation to items identified by said other code number perforations.

11. A system for transmitting control signals to a device adapted to record successive items of information in accordance with perforations arranged singly or in combinations, which comprises a plurality of perforated tapes each having groups of perforations in accordance with a predetermined code system corresponding with a portion of each item of the information to be recorded, each of said tapes having also groups of perforations in advance of each item represented by said first mentioned groups of perforations to provide a code number for each item, separate means for advancing and analyzing each of said tapes, a plurality of electrical circuits interconnecting said separate means with each other and with said device, means in said circuits controlled by the perforations in said tapes for selecting the circuits to be closed at periodic intervals, a cam unit having a plurality of switches for closing selected circuits at periodic intervals, the arrangement being such that the circuits which interconnect said separate means serve to compare the code number perforations in the several tapes, means for disabling the system when the code numbers being compared do not coincide, means in said circuits controlled by a perforation group provided in one of said tapes in lieu of certain code number perforations therein for preventing transmission of control signals to said device in relation to the item identified by said certain code number perforations, and means in said circuits controlled by a single perforation group in said one of said tapes following other code number perforations therein for causing the transmission of control signals to said device successively from said plurality of tapes in relation to items identified by said other code number perforations, and means operated by said cam unit for controlling the operation of the tape advancing means for said tapes when said control signals are being transmitted and when transmission of control signals is prevented.

12. A system for transmitting control signals to a device adapted to record successive items of information in accordance with perforations arranged singly or in combinations, which comprises a plurality of perforated tapes each having groups of perforations in accordance with a predetermined code system corresponding with a portion of each item of the information to be recorded, each of said tapes having also groups of perforations in advance of each item represented by said first mentioned groups of perforations to provide a code number for each item, separate means for advancing and analyzing each of said tapes, a plurality of electrical circuits interconnecting said separate means with each other and with said device, means in said circuits controlled by the perforations in said tapes for selecting the circuits to be closed at periodic intervals, a cam unit having a plurality of cams and a plurality of switches for closing selected circuits at periodic intervals, the arrangement being such that the circuits which interconnect said separate means serve to compare the code number perforations in the several tapes, means for disabling the system when the code designations being compared do not coincide, means in said circuits controlled by a perforation group in one of said tapes in lieu of certain code number perforations for preventing transmission of control signals to said device in relation to the item identified by said certain code number perforations, and separate cams in said cam unit operated at different speeds for controlling the operation of the tape advancing means for at least one of said tapes during the code number comparing operation and when the transmission of control signals is prevented.

13. A system for transmitting control signals to a device adapted to record successive items of information in accordance with perforations arranged singly or in combinations, which comprises a plurality of perforated tapes each having groups of perforations in accordance with a predetermined code system corresponding with a portion of each item of the information to be recorded, each of said tapes having also groups of perforations in advance of each item represented by said first mentioned groups of perforations to provide a code number for each item, separate means for advancing and analyzing each of said tapes, a plurality of electrical circuits interconnecting said separate means with each other and with said device, means in said circuits controlled by the perforations in said tapes for selecting the circuits to be closed at periodic intervals, a cam unit having a plurality of cams and a plurality of switches for closing selected circuits at periodic intervals, the arrangement being such that the circuits which interconnect said separate means serve to compare the code number perforations in the several tapes, means for disabling the system when the code designations being compared do not coincide, means in said circuits controlled by a perforation group in one of said tapes in lieu of certain code number perforations for preventing transmission of control signals to said device in relation to the item identified by said certain code number perforations, and means in said circuits controlled by a perforation group in said one of said tapes immediately following other code number perforations for initiating the transmission of control signals to said device in accordance with the perforations in said tapes identified with items of information related to said other code number perforations.

14. A system for transmitting control signals to a device adapted to record successive items of information in accordance with perforations arranged singly or in combinations, which comprises a plurality of perforated tapes each having groups of perforations in accordance with a predetermined code system corresponding with a portion of each item of the information to be recorded, each of said tapes having also groups of perforations in advance of each item represented by said first mentioned groups of perforations to provide a code number for each item, separate means for advancing and analyzing each of said tapes, a plurality of electrical circuits interconnecting said separate means with each other and with said device, means in said circuits controlled by the perforations in said tapes for selecting the circuits to be closed at periodic intervals, a cam unit having a plurality of cams and a plurality of switches for closing selected circuits at periodic intervals, the arrangement being such that the circuits which interconnect said separate means serve to compare the code number perforations in the several tapes, means for disabling the system when the code designations being compared do not coincide, means in said circuits controlled by a perforation group in one of said tapes in lieu of certain code number perforations for preventing transmission of control signals to said device in relation to the item identified by said certain code number perforations, and means in said circuits controlled by a perforation group in said one of said tapes immediately following other code number perforations for initiating the transmission of control signals to said device in accordance with the perforations in said tapes identified with items of information related to said other code number perforations, separate cams in said cam unit controlling the operation of the tape advancing means for at least one of the tapes during the comparing cycle, during the interval in which the transmission of control signals is prevented, and during said transmission of control signals.

15. A system for transmitting control signals to a device adapted to record successive items of information in accordance with perforations arranged singly or in combinations, which comprises a plurality of perforated tapes each having groups of perforations in accordance with a predetermined code system corresponding with a portion of each item of the information to be recorded, each of said tapes having also groups of perforations in advance of each item represented by said first mentioned groups of perforations to provide a code number for each item, separate means for advancing and analyzing each of said tapes, a plurality of electrical circuits interconnecting said separate means with each other and with said device, means in said circuits controlled by the perforations in said tapes for selecting the circuits to be closed at periodic intervals, a cam unit having a plurality of cams and a plurality of switches for closing selected circuits at periodic intervals, the arrangement being such that the circuits which interconnect said separate means serve to compare the code number perforations in the several tapes, means for disabling the system when the code designations being compared do not coincide, means in said circuits controlled by a perforation group in one of said tapes in lieu of certain code number perforations for preventing transmission of control signals to said device in relation to the item identified by said certain code number perforations, and means in said circuits controlled by a perforation group in said one of said tapes immediately following other code number perforations for initiating the transmission of control signals to said device in accordance with the perforations in said tapes identified with items of information related to said other code number perforations, separate cams in said cam unit controlling the operation of the tape advancing means for at least one of the tapes during the comparing cycle, during the interval in which the transmission of control signals is prevented, and during said transmission of control signals, each of said cams being arranged to cause the operation of the tape advancing means for said one tape at a predetermined speed different from the other of said cams.

16. A method of producing an information storing control tape which comprises applying signal control formations to a plurality of tapes at different times in accordance with a predetermined code system to provide in each tape groups of signal control formations corresponding with successive items of information, the successive items represented by the formations in one tape being correlated with those in another, applying to each of said tapes formations affording a code designation in accordance with said code system in advance of each group of said signal control formations, comparing the related code designation formations in the several tapes, controlling in cyclic succession by the several tapes the simultaneous operation of one or more devices for applying groups of signal control formations to a combined tape, to thereby produce in said combined tape successive groups of control formations corresponding with those in the several tapes of said plurality of tapes but only so long as the successive code designations in the several tapes coincide, and so controlling the operation of said devices as to omit from said combined tape the formations identified with said code designations.

17. A method of producing an information storing control tape which comprises applying signal control formations to a plurality of tapes at different times in accordance with a predetermined code system to provide in each tape groups of control formations corresponding with successive items of information, the successive items represented by the formations in one tape being correlated with those in another, controlling in cyclic succession by the several tapes the simultaneous operation of one or more devices for applying groups of signal control formations to a combined tape, to thereby produce in said combined tape successive groups of control formations corresponding with those in the several tapes of said plurality of tapes, and so controlling said devices as to omit from said combined tape formations related to items identified in one of said tapes but not in another.

18. A method of the character set forth in claim 16 in which said devices are so controlled from said plurality of tapes as to omit from the combined tape all signal control formations relating to an item not identified by code designations in each of said plurality of tapes.

19. A control system for a device having therein a plurality of means for forming in a tape groups of signal control means and tape advancing and operating means for said means for forming signal control means in said tape which comprises a plurality of tapes each having successive groups of signal control means in accordance with a predetermined code system, devices for separately advancing said tapes and analyzing the successive groups of signal control means therein, electrical circuits controlled by said tapes for simultaneously selecting one or more of said first-mentioned means to be operated and for operating said tape advancing means and operating the selected ones of said first-mentioned means of said device and for operating said tape advancing and analyzing devices, and means comprising a driven cam unit and a plurality of relays for closing certain of said circuits selected by one and then another of said plurality of tapes in predetermined sequence to reproduce in the tape of said device successive groups of signal control means appearing in said plurality of tapes.

References Cited in the file of this patent

UNITED STATES PATENTS

| | | |
|---|---|---|
| 2,091,286 | Krum et al. | Aug. 31, 1937 |
| 2,609,050 | Roth | Sept. 2, 1952 |
| 2,674,312 | Joel | Apr. 6, 1954 |
| 2,711,794 | Ghertman | June 28, 1955 |
| 2,770,356 | Lindberg | Nov. 13, 1956 |
| 2,788,886 | Paulding et al. | Apr. 16, 1957 |
| 2,789,643 | Janaushek | Apr. 23, 1957 |

UNITED STATES PATENT OFFICE
CERTIFICATION OF CORRECTION

Patent No. 2,973,897                                March 7, 1961

Herbert L. Paulding et al.

It is hereby certified that error appears in the above numbered patent requiring correction and that the said Letters Patent should read as corrected below.

Column 4, line 5, for "has" read -- as --; column 8, line 17, for "ate any switch arms in the decoded identified with those" read -- ates two switch arms 135 and 135a to shift these from --; line 44, for "and", first occurrence, read -- with --; column 12, line 9, for "so" read -- as --; line 10, after "through" insert -- line --; column 15, line 50, for "38b" read -- 38B --; column 16, line 9, for "position" read -- positive --; column 19, line 54, after "long" insert -- as --; column 24, line 47, strike out "and".

Signed and sealed this 12th day of September 1961.

(SEAL)
Attest:

ERNEST W. SWIDER
Attesting Officer

DAVID L. LADD
Commissioner of Patents